(12) United States Patent  
Shingai et al.

(10) Patent No.: US 9,019,578 B2  
(45) Date of Patent: Apr. 28, 2015

(54) IMAGE READING APPARATUS AND IMAGE FORMING APPARATUS

(71) Applicants: Hiroyuki Shingai, Nagoya (JP); Takayuki Akimatsu, Nagoya (JP); Yasuo Yamasaki, Nagoya (JP)

(72) Inventors: Hiroyuki Shingai, Nagoya (JP); Takayuki Akimatsu, Nagoya (JP); Yasuo Yamasaki, Nagoya (JP)

(73) Assignee: Brother Kogyo Kabushiki Kaisha, Nagoya-shi, Aichi-Ken (JP)

( * ) Notice: Subject to any disclaimer, the term of this patent is extended or adjusted under 35 U.S.C. 154(b) by 0 days.

(21) Appl. No.: 14/040,057

(22) Filed: Sep. 27, 2013

(65) Prior Publication Data

US 2014/0146372 A1  May 29, 2014

(30) Foreign Application Priority Data

Nov. 28, 2012 (JP) .................................. 2012-259987

(51) Int. Cl.  
*H04N 1/04* (2006.01)  
*H04N 1/10* (2006.01)

(52) U.S. Cl.  
CPC .................................. *H04N 1/1039* (2013.01)

(58) Field of Classification Search  
CPC .................................................. H04N 1/1039  
USPC .................................. 358/498, 474, 496, 497  
See application file for complete search history.

(56) References Cited

U.S. PATENT DOCUMENTS 7,948,663 B2 * 5/2011 Doan et al. .................... 358/474

FOREIGN PATENT DOCUMENTS

JP  H03-100669 A  4/1991

* cited by examiner

*Primary Examiner* — Houshang Safaipour  
(74) *Attorney, Agent, or Firm* — Banner & Witcoff, Ltd.

(57) ABSTRACT

An image reading apparatus having a conveyed document reading function and a placed document reading function includes: a moving mechanism for moving an imaging unit; a hinge mechanism for swingably connecting a document cover to a document platen; a conveyance mechanism provided to the document cover for conveying a document upon operation of the conveyed document reading function; a driving force transmission mechanism for selectively transmitting a driving force generated from a driving source to the moving mechanism or the conveyance mechanism; a first gear rotatable by receiving the driving force from the driving force transmission mechanism; and a second gear rotatable with being meshed with the first gear for transmitting the driving force to the moving mechanism or the conveyance mechanism, a rotating center line of which coincides with a swinging center line of the hinge mechanism.

17 Claims, 17 Drawing Sheets

IMAGE READING APPARATUS AND IMAGE FORMING APPARATUS

CROSS-REFERENCE TO RELATED APPLICATIONS

This application claims priority from Japanese Patent Application No. 2012-259987 filed on Nov. 28, 2012, the entire subject matter of which is incorporated herein by reference.

TECHNICAL FIELD

Illustrative aspects of the invention relate to an image reading apparatus and an image forming apparatus having the image reading apparatus.

BACKGROUND

There have been disclosed an image reading apparatus configured to drive a document conveyance mechanism for implementing a conveyed document reading function and an imaging unit reciprocating mechanism for implementing a placed document reading function by one driving source.

The driving source and the imaging unit reciprocating mechanism are provided to a document platen. The document conveyance mechanism is provided to a document cover. Incidentally, the document cover is rotatably connected to the document platen through a hinge mechanism.

Further, according to the related-art image reading apparatus, a driving force is transmitted from the document platen to the document cover through a joint part having an output part provided to the document platen and an input part provided to the document cover.

The output part is provided at a part of one end-side in a moving direction of the imaging unit, which part deviates from a hinge mechanism towards a placing surface. Incidentally, the placing surface is an area in which a document is to be placed when performing a reading operation by the placed document reading function.

SUMMARY

In the above-described related-art image reading apparatus, the output part and the input part are displaced such that they are separated and contacted from and to each other in conjunction with rotation of the document cover. That is, at a state where the placing surface is covered by the document cover, the output part and the input part are connected, so that the driving force can be transmitted. On the other hand, at a state where the document cover is spaced from the placing surface, the output part and the input part are separated, so that the driving force cannot be transmitted.

Therefore, illustrative aspects of the invention provide a configuration for transmitting a driving force.

According to one illustrative aspect of the invention, there is provided an image reading apparatus having a conveyed document reading function of reading a conveyed document and a placed document reading function of reading a document placed on a placing surface of a document platen, the image reading apparatus comprising: an imaging unit that is movable below the placing surface; a moving mechanism configured to move the imaging unit; a document cover that is displaceable between a position closing the placing surface and a position spaced from the placing surface; a hinge mechanism configured to connect the document cover to the document platen such that the document cover is swingable; a conveyance mechanism that is provided to the document cover and is configured to convey a document placed on the document cover upon operation of the conveyed document reading function; a driving force transmission mechanism configured to selectively transmit a driving force generated from a driving source to the moving mechanism or the conveyance mechanism; a first gear which, when the driving force is transmitted to the moving mechanism or the conveyance mechanism, is configured to rotate by receiving the driving force from the driving force transmission mechanism; and a second gear configured to rotate with being meshed with the first gear and to transmit the driving force to the moving mechanism or the conveyance mechanism, the second gear having a rotating center line coinciding with a swinging center line of the hinge mechanism.

According thereto, it is possible to swing the document cover with the first gear being meshed with the second gear. That is, it is possible to transmit the driving force all the time, irrespective of a position of the document platen 5. Therefore, it is possible to transmit the driving force by the configuration different from the above-described related art.

DETAILED DESCRIPTION

An 'exemplary embodiment of the invention' that will be described later shows an example of an exemplary embodiment. That is, the invention are not limited to specific means and structure and the like described in the below exemplary embodiment.

Hereinafter, an image forming apparatus and an image reading apparatus according to an exemplary embodiment of the invention will be described with reference to the drawings. Incidentally, arrows and the like indicating directions in the respective drawings are shown so as to easily understand a relation between the drawings, and the invention is not limited to the directions shown in the respective drawings.

1. Outline of Image Forming Apparatus

Figure 1:
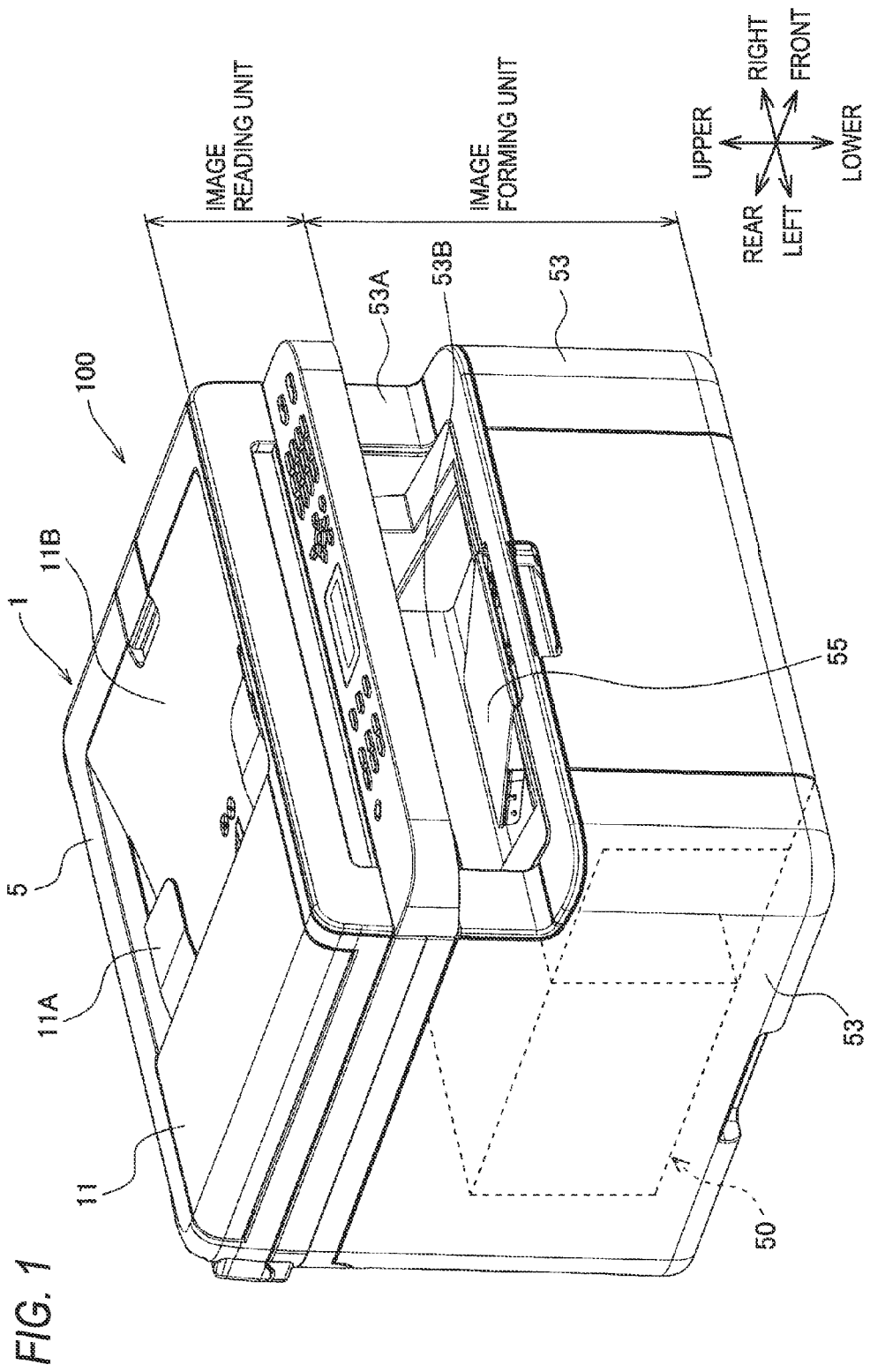
FIG. 1 is an outward perspective view showing a state where a document cover 5 is closed in an image reading apparatus 1 according to an exemplary embodiment of the invention.

As shown in FIG. 1, an image forming apparatus 100 according to an exemplary embodiment integrally includes an image reading apparatus 1 and an image forming unit 50. The image forming unit 50 is accommodated in a housing 53. A joint cover 53A is provided at an upper part of the housing 53. The joint cover 53A connects the image reading apparatus 1 and the image forming unit 50 with a space 53B therebetween.

The image forming unit 50 is configured to form an image on a sheet. The sheet having the image formed by the image forming unit 50 is discharged to the space 53B and is then placed onto a discharge tray 55 that is provided on an upper surface of the housing 53. Incidentally, the image forming unit 50 of this exemplary embodiment is an electrophotographic type of transferring developer to the sheet to thereby form the image.

2. Outline of Image Reading Apparatus

The image reading apparatus 1 has a conveyed document reading function and a placed document reading function. The conveyed document reading function is a function of reading a document being conveyed. The placed document reading function is a function of reading a document that is placed on a placing surface 3A of a document platen 3 shown in FIG. 2.

The document platen 3 is provided with a first reading window blocked by a transparent platen 3B such as glass, acryl and the like. The platen 3B configures the placing surface 3A. An upper surface of the document platen 3 is mounted with a document cover 5 via a plurality of hinge mechanisms 5A, 5B.

The respective hinge mechanisms 5A, 5B are fixed to the document platen 3 by restraint parts 5C. That is, the respective restraint parts 5C restrain a swinging center line L2 of the hinge mechanisms 5A, 5B from being displaced relative to the document platen 3. Incidentally, the restraint part 5C of this exemplary embodiment is a mechanical fastening means such as a screw.

Figure 2:
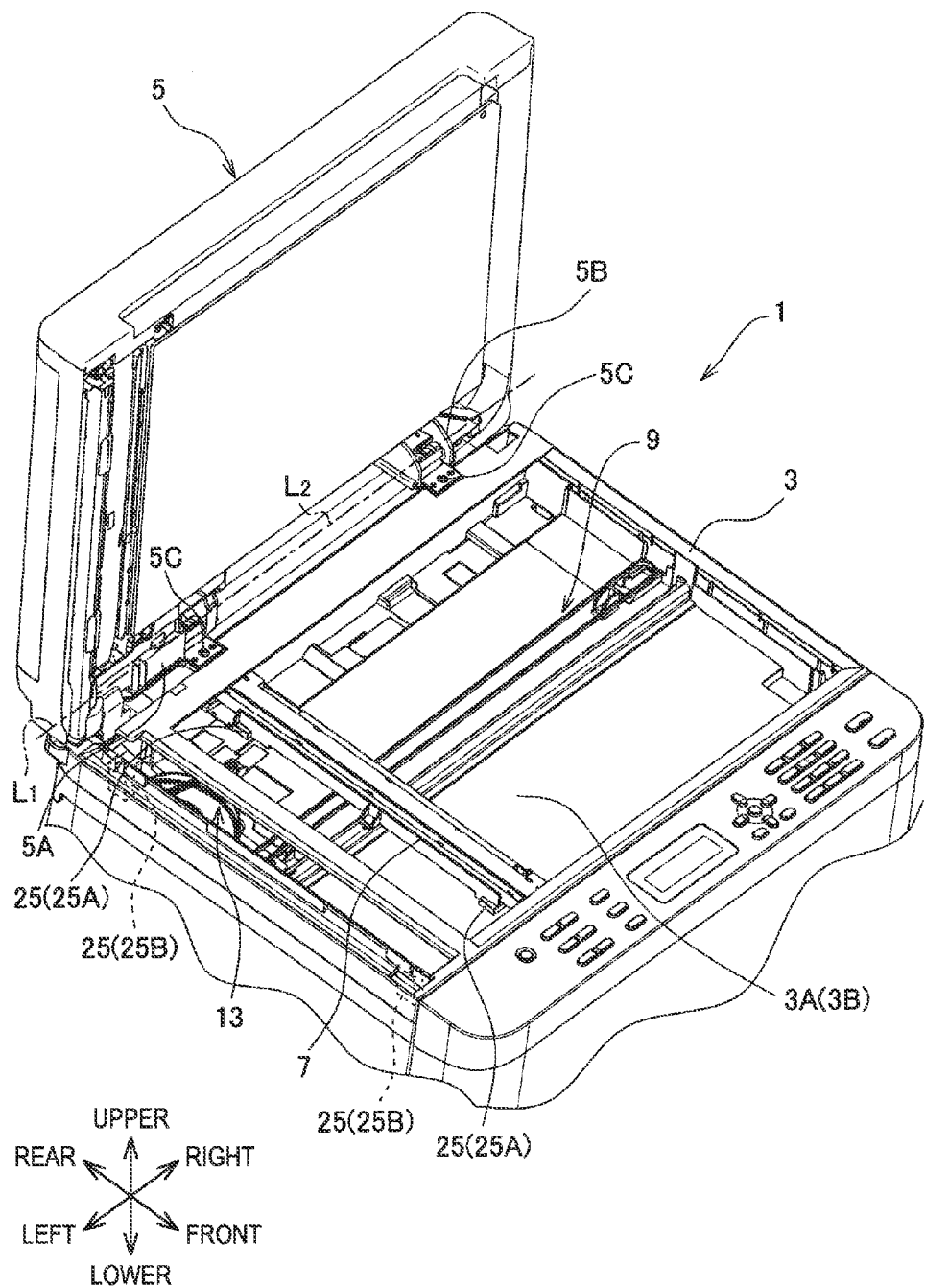
FIG. 2 is another outward perspective view showing a state where the document cover 5 is opened in the image reading apparatus 1 according to the exemplary embodiment of the invention.

The document cover 5 can be rotation-displaced between a position closing the document platen 3 (refer to FIG. 1) and a position spaced from the document platen 3 (refer to FIG. 2). Incidentally, when a document is read using the placed document reading function, it is necessary for a user to manually open upwards the document cover 5 and then to place a document on the placing surface 3A.

An imaging unit 7 that is movable along the placing surface 3A is provided below the placing surface 3A. The imaging unit 7 is configured to receive light that is illuminated and then reflected on a document and to generate an electric signal based on the received light. Then, the image reading apparatus 1 is configured to convert an image described on the document, such as letters, into an electric signal through the imaging unit 7 and thus read an image.

In this exemplary embodiment, a CIS (Contact Image Sensor) is used as the imaging unit 7. A longitudinal direction of the CIS (the imaging unit 7) is just below the placing surface 3A and extends in a direction orthogonal to the moving direction of the imaging unit 7.

Figure 3:
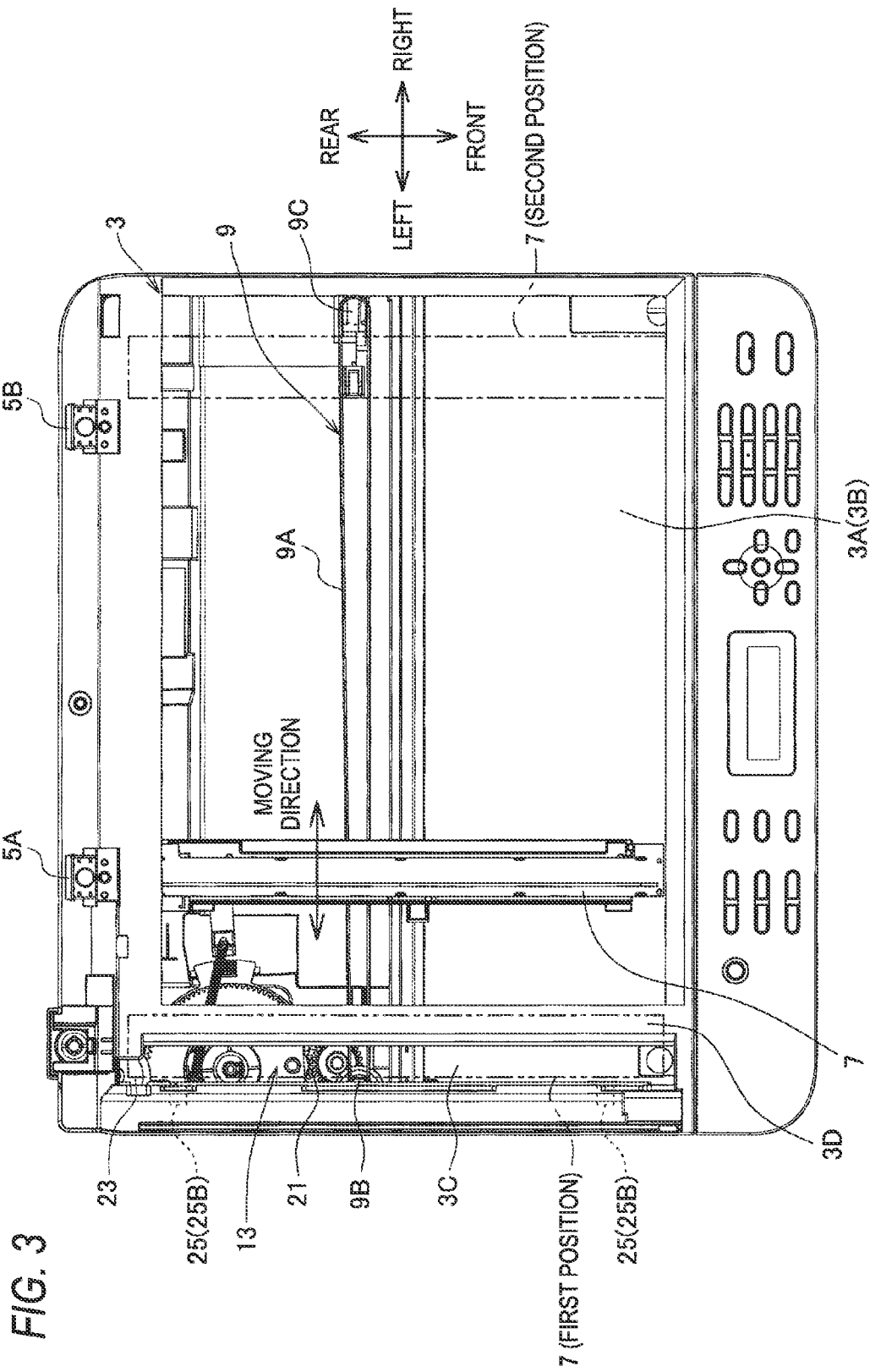
FIG. 3 is a plan view of a document platen 3 showing a state where the document cover 5 according to the exemplary embodiment of the invention is detached.

Further, as shown in FIG. 3, the imaging unit 7 is mounted to the document platen 3 so that it can be moved in the longitudinal direction of the placing surface 3A. A moving mechanism 9 moves the imaging unit 7 between a first position and a second position.

The first position is a position that is set at one end-side of the moving direction of the imaging unit 7. The second position is a position that is set at the other end-side of the moving direction. Incidentally, in this exemplary embodiment, the 'longitudinal direction of the placing surface 3A' coincides with a left-right direction of the image reading apparatus 1.

The moving mechanism 9 includes a pulley 9B having a first tooth, a pulley 9C having a second tooth and a belt 9A having a tooth. The pulley 9B having a first tooth and the pulley 9C having a second tooth are rotatably fixed to the document platen 3. The belt 9A having a tooth extends between the pulley 9B having a first tooth and the pulley 9C having a second tooth. The belt 9A having a first tooth is applied with a driving force from the pulley 9B having a first tooth and is thus rotated.

The imaging unit 7 is connected to the belt 9A having a tooth. Therefore, the imaging unit 7 is moved along a rotating direction of the belt 9A having a tooth. The pulley 9B having a first tooth is provided at one end-side of the moving direction of the imaging unit 7. The pulley 9C having a second tooth is provided at the other end-side of the moving direction of the imaging unit 7.

Upon operation of the conveyed document reading function, the imaging unit 7 reads an image through a second reading window 3C at a state where it is stopped just below the second reading window 3C. On the other hand, upon operation of the placed document reading function, the imaging unit 7 reads an image while it is being moved just below the placing surface 3A.

Incidentally, the second reading window 3C is also blocked by a transparent platen such as glass, like the first reading window, e.g., the placing surface 3A. The placing surface 3A and the second reading window 3C are partitioned by a beam-shaped partition member 3D.

Figure 5:
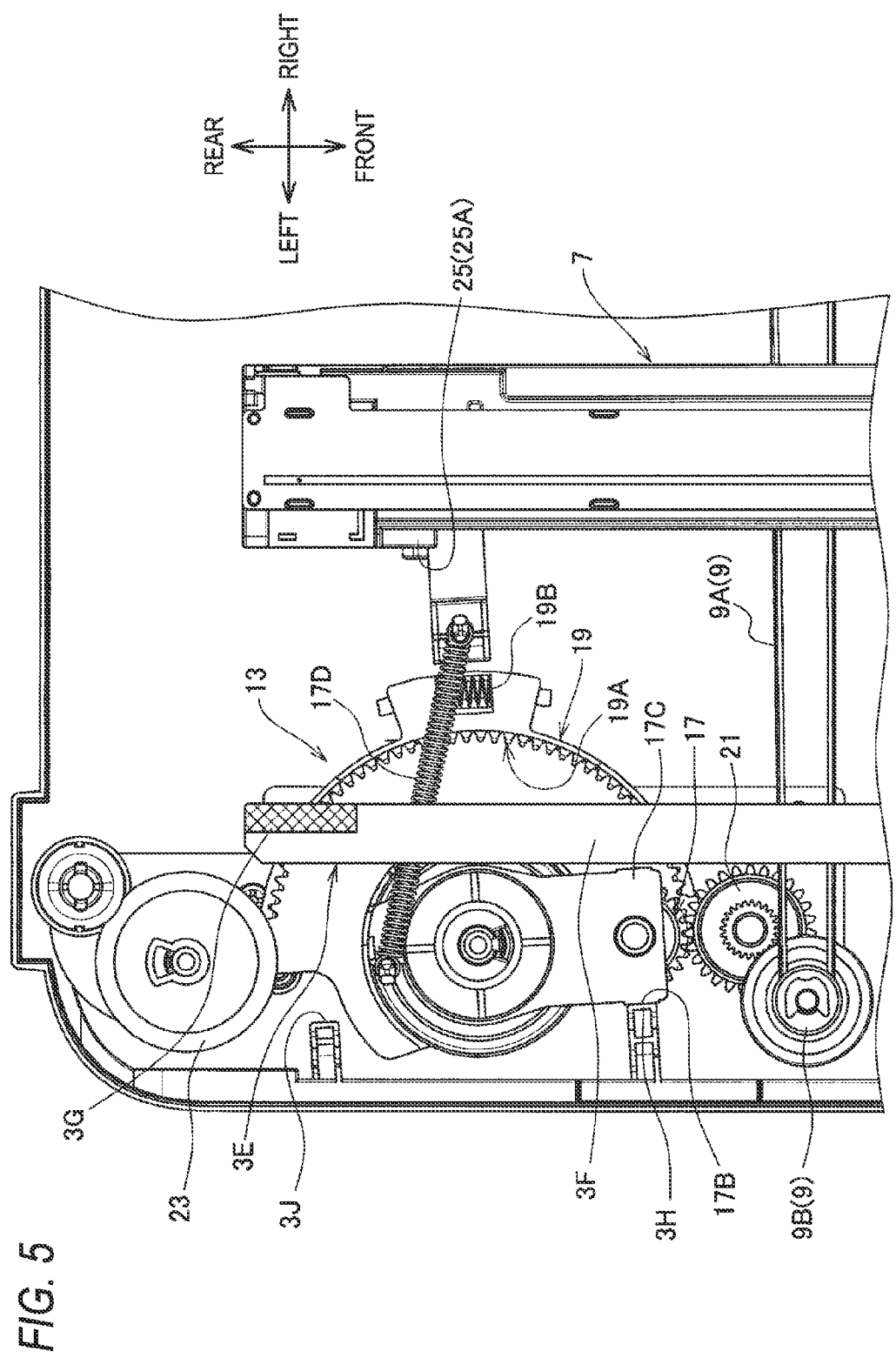
FIGS. 5 to 9 show a structure and an operation of a driving force transmission mechanism 13 according to the exemplary embodiment of the invention.

Further, an adjustment basis 3E is provided at a part that is a boundary part between the placing surface 3A and the second reading window 3C and faces the imaging unit 7, as shown in FIG. 5. The adjustment basis 3E is to re-adjust a basis of a color and shading and a basis position of the imaging unit 7 upon reading.

That is, the adjustment basis 3E includes a white background part 3F that extends in the extending direction (a front-rear direction, in this exemplary embodiment) of the imaging unit 7 and black background parts 3G that are provided at both ends in the extending direction of the white background part 3F. A control unit 30 that will be described later is configured to execute the reading with using read data obtained when reading of the white background part 3F as a basis of the color and shading.

Further, the control unit 30 determines a standby position (which is also referred to as a home position) of the imaging unit 7 on the basis of a boundary position of the white background part 3F and the black background parts 3G and controls the moving mechanism 9, e.g., controls a rotation of a driving source 31 that will be described later.

Incidentally, the standby position is set at the second position-side, rather than the first position. The adjustment basis 3E is set at the second position-side, rather than the standby position. That is, regarding the moving direction of the imaging unit 7, the first position, the standby position, the adjustment basis 3E and the second position are arranged in order of the first position, the standby position, the adjustment basis 3E and the second position from one end-side of the moving direction.

Figure 4:
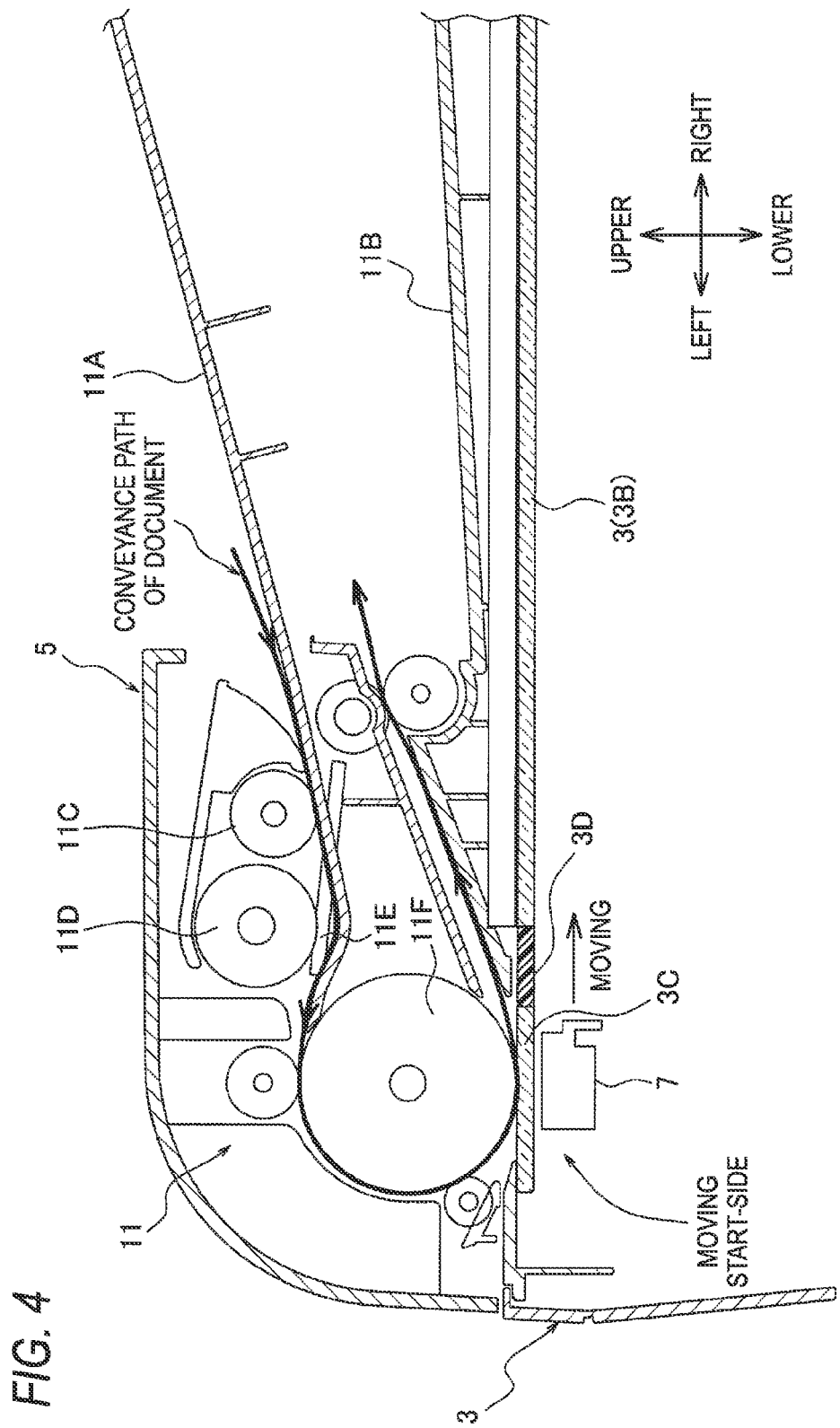
FIG. 4 is a pictorial view of a conveyance mechanism 11 (an auto document feeder) according to the exemplary embodiment of the invention.

Further, as shown in FIG. 4, the document cover 5 is provided with a conveyance mechanism 11. The conveyance mechanism 11 is an example of the auto document feeder that conveys a document towards the second reading window 3C upon operation of the conveyed document reading function.

That is, the conveyance mechanism 11 sequentially conveys one or more documents one at a time, which are placed on a document tray 11A, towards the second reading window 3C and sequentially discharges the documents, for which the reading has been completed, towards a discharge tray 11B.

The conveyance mechanism 11 includes a suction roller 11C, a separation roller 11D, a separation pad 11E, a conveying roller 11F and the like. The suction roller 11C delivers the document placed on the document tray 11A towards the separation roller 11D.

The separation roller 11D is configured to separate two or more overlapping sheets one sheet by one sheet in cooperation with the separation pad 11E and deliver the sheet to the conveying roller 11F. The conveying roller 11F is configured to convey the document to the second reading window 3C.

3. Driving Force Transmission Mechanism 3.1 Configuration of Driving Force Transmission Mechanism In this exemplary embodiment, the moving mechanism 9 and the conveyance mechanism 11 are driven by one driving source 31. That is, the driving force transmission mechanism 13 is configured to selectively transmit a driving force, which is generated in the driving source 31 such as an electric motor, to the moving mechanism 9 or the conveyance mechanism 11. Incidentally, the driving source 31 and the driving force transmission mechanism 13 are arranged at positions lower than the placing surface 3A in the document platen 3.

Figure 6:
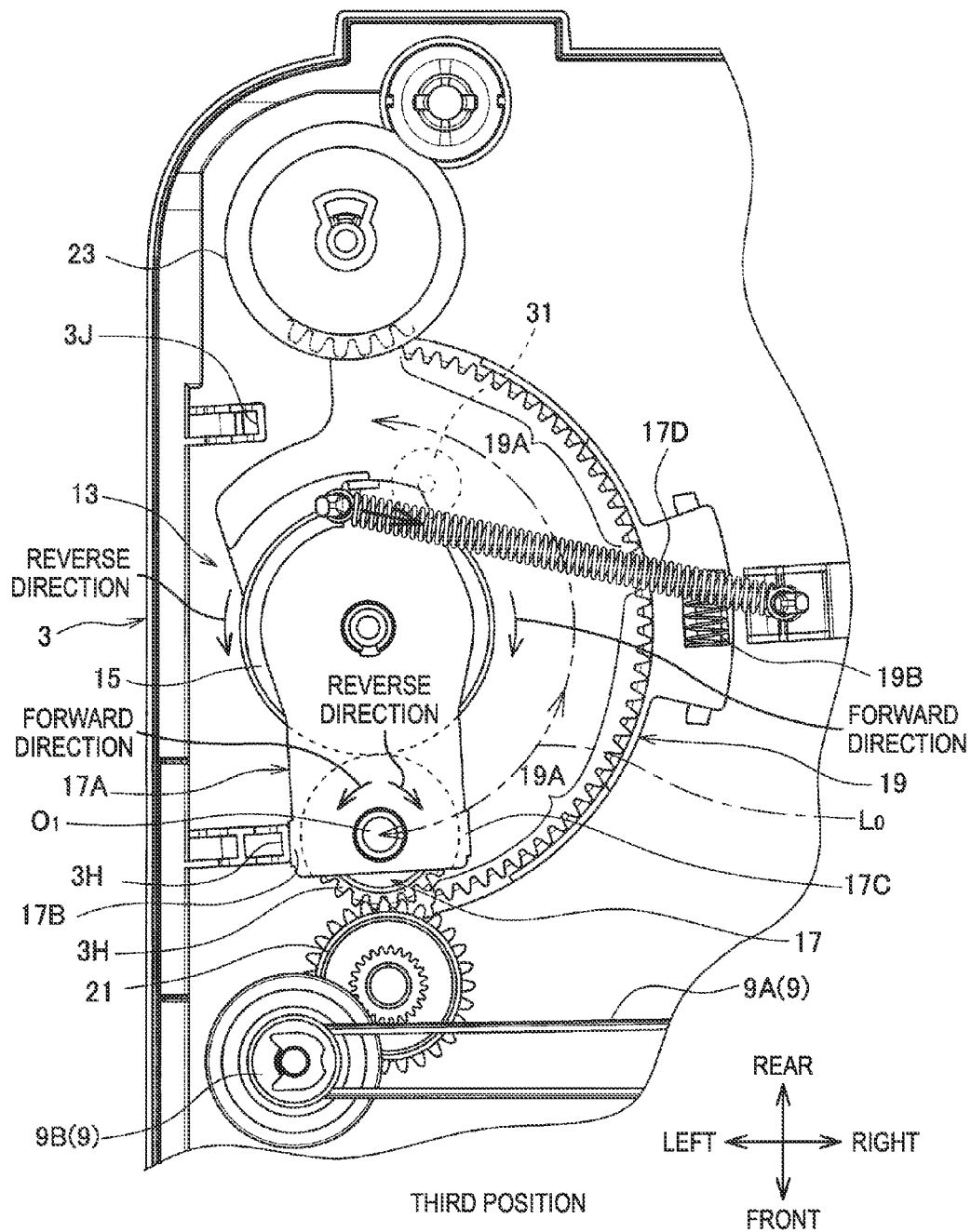

In this exemplary embodiment, as shown in FIG. 6, the driving force transmission mechanism 13 is configured by a planetary gear mechanism having a sun gear 15, a planetary gear 17, a meshing part 19 and the like. The sun gear 15 is rotated without being displaced relative to the document platen 3.

The sun gear 15 is rotated by a driving force applied from the driving source 31 and a rotating direction thereof is a forward rotation or reverse rotation in conjunction with a rotating direction of the driving source 31. Incidentally, the driving source 31 is provided in a space opposite to a space of the placing surface 3A with the sun gear 15 being interposed therebetween, e.g., a space below the sun gear 15 in this exemplary embodiment.

Figure 9:
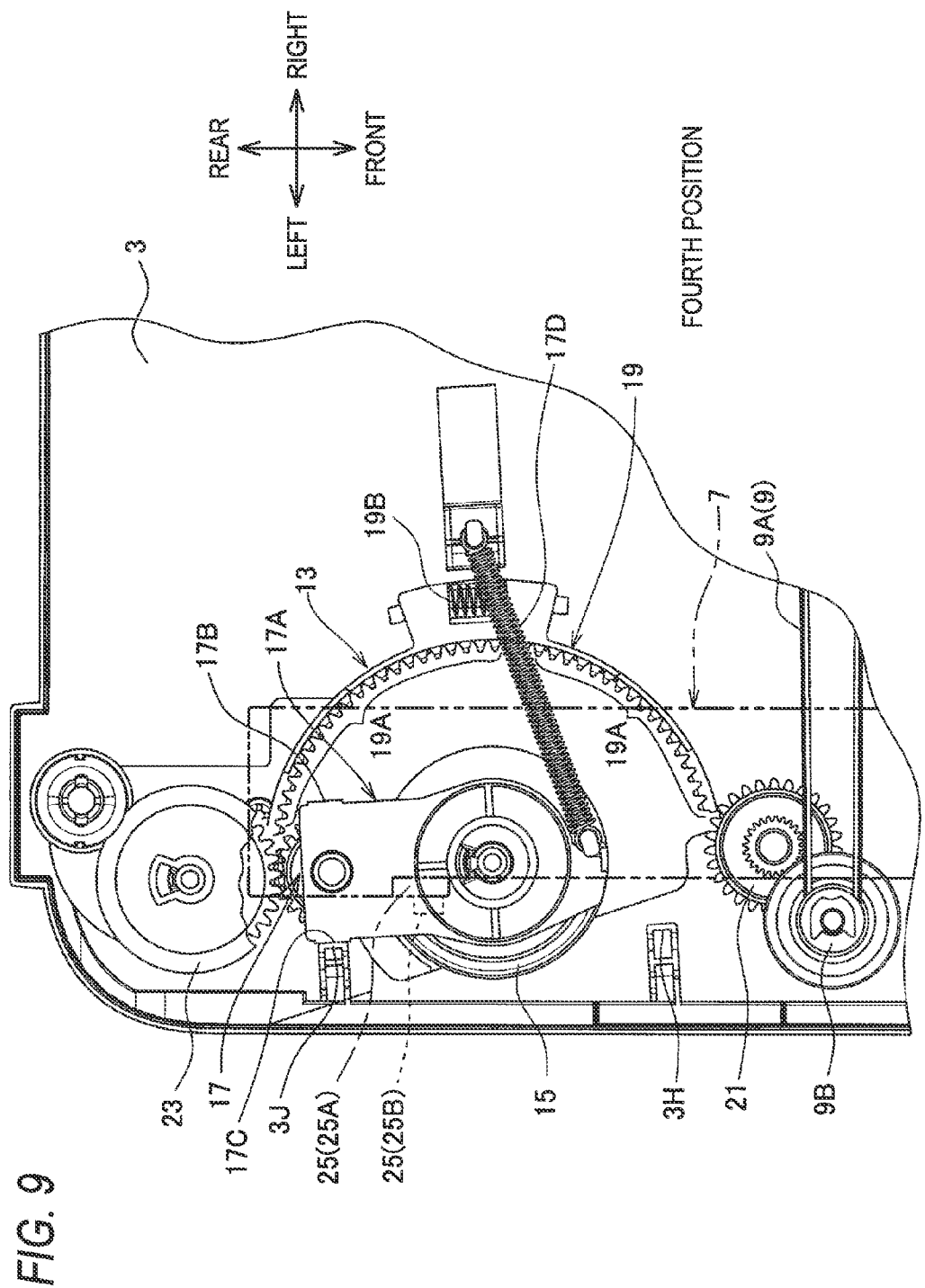

The planetary gear 17 is rotated with being meshed with the sun gear 15 and has a rotation center O1 capable of revolving around the sun gear 15 between a third position shown in FIG. 6 and a fourth position shown in FIG. 9 about a rotation center of the sun gear 15 serving as a revolution center. Incidentally, an operation that the planetary gear 17 is rotated about the rotation center O1 is hereinafter referred to as rotation.

When the sun gear 15 is rotated, the planetary gear 17 is applied with a force (hereinafter, referred to as a rotation force) enabling the planetary gear 17 to rotate on its own axis and a force (hereinafter, referred to as a revolution force) enabling the planetary gear 17 to revolve around the sun gear 15. Therefore, when the sun gear 15 is rotated in the forward direction, a revolution force in a direction (a right rotating direction in FIG. 6) from the fourth position towards the third position is applied to the planetary gear 17.

On the other hand, when the sun gear 15 is rotated in the reverse direction, a revolution force in a direction (a left rotating direction in FIG. 6) from the third position towards the fourth position is applied to the planetary gear 17. When the revolution force becomes larger, the planetary gear 17 revolves around the sun gear 15 in the direction of the revolution force. On the other hand, when the revolution force is small, the planetary gear 17 rotates on its own axis without revolving around the sun gear 15.

Incidentally, a direction along which the planetary gear 17 rotates on its own axis when the sun gear 15 is rotated in the forward direction is referred to as a forward rotation direction of the planetary gear 17. Likewise, a direction along which the planetary gear 17 rotates on its own axis when the sun gear 15 is rotated in the reverse direction is referred to as a reverse rotation direction of the planetary gear 17.

An arm 17A supports the planetary gear 17 so that it can rotate on its own axis and revolve around the sun gear 15. One end of the arm 17A in an extending direction thereof is rotatably supported on the same axis as the sun gear 15. The planetary gear 17 is rotatably mounted to the other end of the arm 17A in the extending direction thereof.

Further, the document platen 3 is provided with a second stopper part 3H and a third stopper part 3J for restraining rotation of the arm 17A. The arm 17A is provided with a second contacted part 17B configured to contact the second stopper part 3H and a third contacted part 17C configured to contact the third stopper part 3J.

As shown in FIG. 6, the second stopper part 3H is contacted to the second contacted part 17B at the third position to thus restrain the arm 17A from being rotated rightwards on the sheet. As shown in FIG. 9, the third stopper part 3J is contacted to the third contacted part 17C at the fourth position to thus restrain the arm 17A from being rotated leftwards on the sheet.

Further, a first spring 17D restrains the planetary gear 17 from being spaced from a first output gear 21 when the sun gear 15 is rotated in the reverse direction. That is, the first spring 17D is configured to apply a force (hereinafter, referred to as a first restraint force), which restrains the planetary gear 17 from revolving around the sun gear 15 towards the fourth position at least when the planetary gear 17 is located at the third position, to the planetary gear 17.

Incidentally, in this exemplary embodiment, the first spring 17D is a tension coil spring. One end of the first spring 17D in an extension direction thereof is connected to an opposite side of the planetary gear 17 with a rotating center of the arm 17A being interposed therebetween and the other end thereof in the extension direction is connected to the document platen 3.

Therefore, the first spring 17D applies a force (hereinafter, referred to as a second restraint force), which restrains the planetary gear 17 from revolving around the sun gear 15 towards the third position when the planetary gear 17 is located at the fourth position, to the arm 17A.

When the planetary gear 17 is located at the fourth position, it means that the driving force is transmitted to the conveyance mechanism 11, at which the sun gear 15 is rotated in the reverse direction, as described later.

When the sun gear 15 is rotated in the reverse direction, a force that enables the planetary gear 17 to revolve around the sun gear 15 from the third position to the fourth position is applied to the planetary gear 17. Therefore, in this exemplary embodiment, at least while the driving force is transmitted to the conveyance mechanism 11, e.g., while the sun gear 15 is meshed with a second output gear 23 and is rotated in the reverse direction, the planetary gear 17 keeps staying at the fourth position even though the second restraint force is not applied, for example.

Thus, in this exemplary embodiment, torque with which the first spring 17D restrains the revolution of the planetary gear 17 at the third position is set to be greater than torque with which the first spring 17D restrains the revolution of the planetary gear 17 at the fourth position.

Specifically, positions of one end and the other end of the first spring 17D in the extension direction are set so that a deformation amount of the first spring 17D at the third position is greater than a deformation amount of the fist spring 17D at the fourth position.

The meshing part 19 is a part that is meshed with teeth of the planetary gear 17 when the planetary gear 17 revolves around the sun gear 15 between the third position and the fourth position. In this exemplary embodiment, the meshing part 19 is configured by an internally-toothed gear. Thus, the meshing part 19 is hereinafter referred to as the internally-toothed gear 19.

As shown in FIG. 6, the internally-toothed gear 19 has a plurality of protrusions 19A protruding towards the sun gear 15. The protrusions 19A are an example of a gear that is provided along a revolution path Lo of the planetary gear 17.

The internally-toothed gear 19 is mounted to the document platen 3 so as to be movable relative to the sun gear 15. Incidentally, in this exemplary embodiment, the internally-toothed gear 19 can be displaced along the revolution path Lo of the planetary gear 17 about the sun gear 15. The internally-toothed gear 19 is provided with a second spring 19B which, when the internally-toothed gear 19 is moved, is configured to return the internally-toothed gear 19 to a position before the moving.

The driving force transmission mechanism 13 includes a first output gear 21 and a second output gear 23, which are meshed with the planetary gear 17. As shown in FIG. 3, the second output gear 23 is provided at a position closer to the hinge mechanism 5A than the first output gear 21 in a direction (a front-rear direction, in this exemplary embodiment) orthogonal to the moving direction of the imaging unit 7 of directions parallel with the placing surface 3A.

That is, the first output gear 21 is provided at an opposite side to the second output gear 23 with the sun gear 15 being interposed therebetween. In other words, the first output gear 21 is located across the sun gear 15 from the second output gear 23. The rotary shaft directions of the sun gear 15, the planetary gear 17, the first output gear 21 and the second output gear 23 are orthogonal to the placing surface 3A.

Further, as shown in FIG. 6, the first output gear 21 is meshed with the planetary gear 17 when the planetary gear 17 is located at the third position. Thus, at the third position, the driving force is transmitted in order of the sun gear 15, the planetary gear 17 and the first output gear 21. The pulley 9B having a first tooth is driven to operate the moving mechanism 9 by the first output gear 21.

When the sun gear 15 is rotated in the forward direction, the moving mechanism 9 moves the imaging unit 7 from the first position towards the second position. When the sun gear 15 is rotated in the reverse direction, the moving mechanism 9 moves the imaging unit 7 from the second position towards the first position. That is, the imaging unit 7 is moved in correspondence to the rotating direction of the sun gear 15.

As shown in FIG. 9, the second output gear 23 is meshed with the planetary gear 17 when the planetary gear 17 is located at the fourth position. Thus, at the fourth position, the driving force is transmitted in order of the sun gear 15, the planetary gear 17 and the second output gear 23, so that the conveying mechanism 11 is operated.

Also, as shown in FIG. 2, a load generation part 25 configured to increase a rotational resistance of the first output gear 21 is provided. The load generation part 25 increases the rotational resistance of the first output gear 21 when the imaging unit 7 is located at the first position, compared to a case where the imaging unit 7 is located at a position, other than the first position.

That is, in this exemplary embodiment, the load generation part 25 includes a first contacted part 25A, which is provided to the imaging unit 7, and a first stopper part 25B that is provided to the document platen 3. As shown in FIG. 9, the first contacted part 25A and the first stopper part 25B are contacted to each other.

Therefore, while the sun gear 15 is rotated in the reverse direction, when the imaging unit 7 is located at the first position and the first contacted part 25A and the first stopper part 25B are thus contacted, the imaging unit 7 is restrained from moving, so that the rotational resistance of the first output gear 21 is increased.

3.2 Tooth Surface Shapes of Internally-Toothed Gear, Planetary Gear, First Output Gear and Second Output Gear Toothed curves of gears to be meshed with each other have typically the same toothed curve. Therefore, the gears that are used for the driving force transmission mechanism 13 have also the same toothed curve, except for a case that will be described later.

Incidentally, all teeth (protrusions) of the sun gear 15 adopt toothed curves by involute curves. Thus, teeth (protrusions), which are not particularly described, of the teeth (protrusions) of the gears configuring the driving force transmission mechanism 13 adopt toothed curves by involute curves.

3.2.1 Tooth Surface Shape of Internally-Toothed Gear

Figure 10:
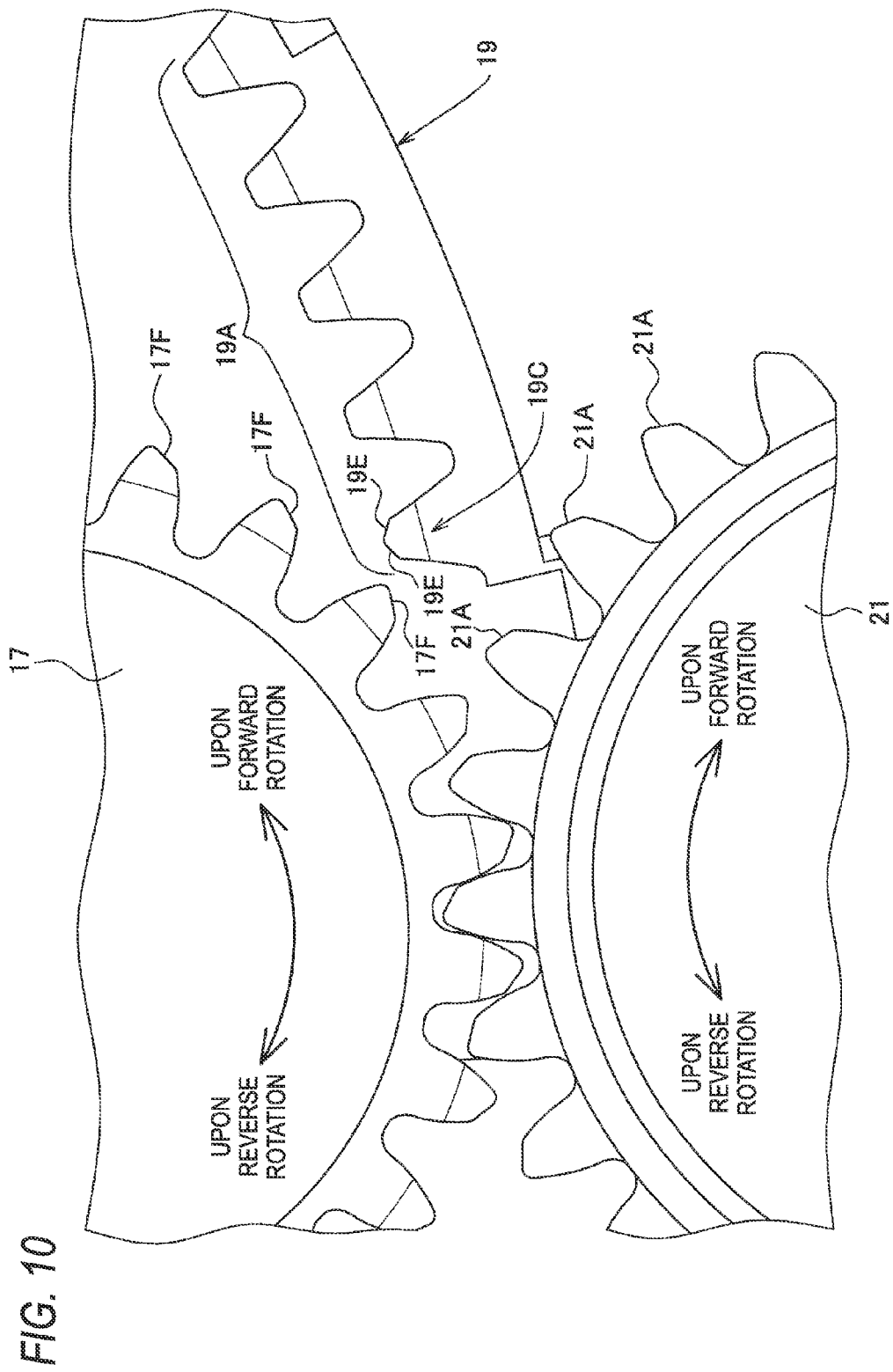
FIGS. 10 and 11 show a tooth surface shape of the driving force transmission mechanism 13 according to the exemplary embodiment of the invention.

Among a plurality of protrusions 19A configuring the internally-toothed gear 19, tooth surfaces of a first protrusion 19C, which is positioned at least at the first output gear 21-side, are provided with first collision surfaces 19E consisting of a curved or planar surface having a curvature radius larger than the toothed curve of the sun gear 15, as shown in FIG. 10.

Figure 11:
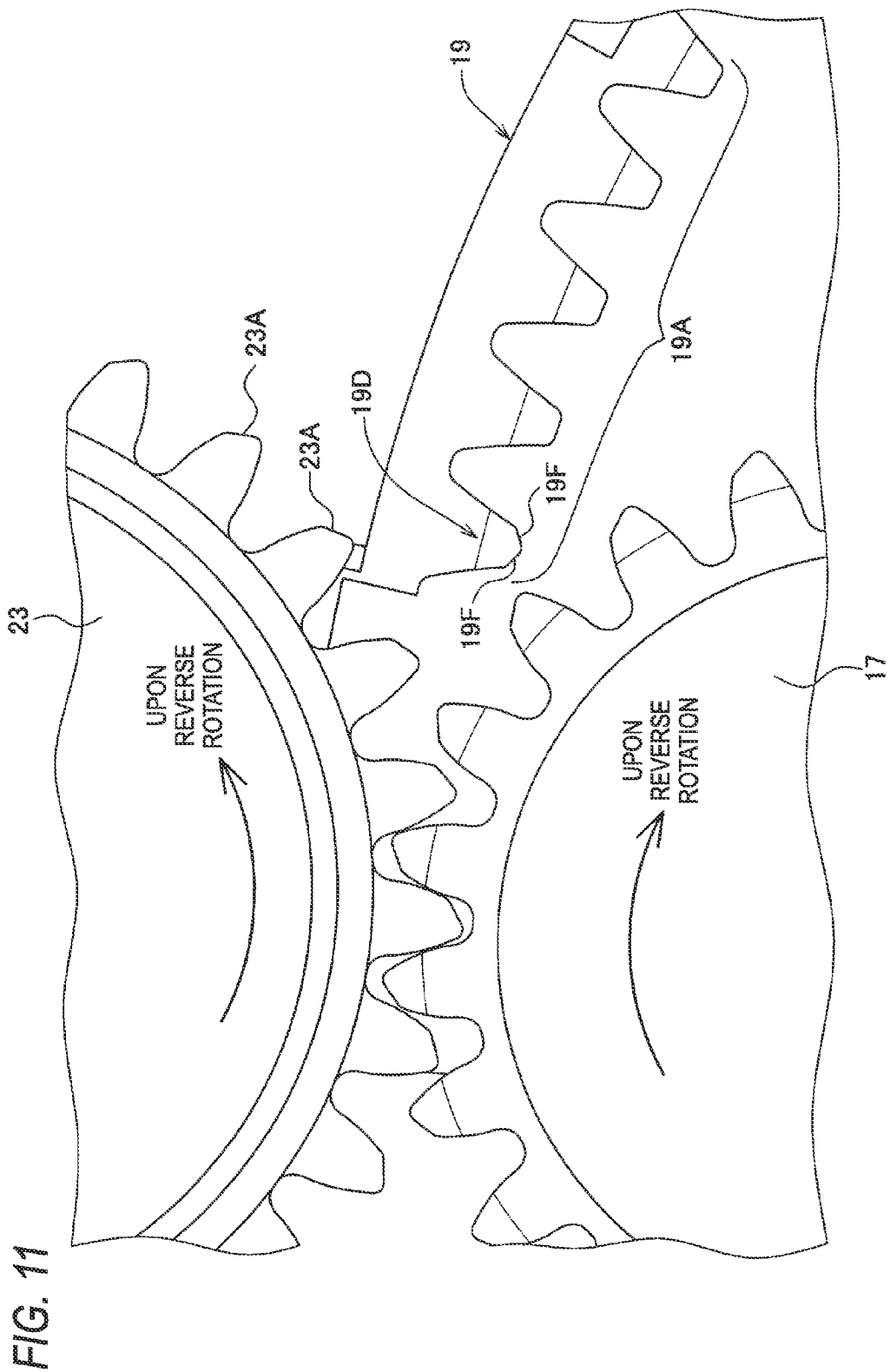

Further, among the plurality of protrusions 19A configuring the internally-toothed gear 19, tooth surfaces of a second protrusion 19D, which is positioned at least at the second output gear 23-side, are provided with second collision surfaces 19F consisting of a curved or planar surface having a curvature radius larger than the toothed curve of the sun gear 15, as shown in FIG. 11.

Incidentally, in this exemplary embodiment, the first protrusion 19C and the second protrusion 19D have the same shape, and the other protrusions 19A except for the first protrusion 19C and the second protrusion 19D have the toothed curve by the involute curve. That is, the other protrusions 19A have the toothed curve that is formed in accordance with the same theory as the sun gear 15.

3.2.2 Tooth Surface Shape of Planetary Gear (Refer to FIG. 10)

When the planetary gear 17 revolves around the sun gear 15 from the fourth position towards the third position, e.g., when the planetary gear 17 is rotated in the reverse direction, a backward tooth surface of the tooth surfaces of the planetary gear 17 in the rotation direction is provided with a third collision surface 17F consisting of a curved or planar surface having a curvature radius larger than the toothed curve of the sun gear 15.

Incidentally, the 'backward tooth surface of the tooth surfaces of the planetary gear 17 in the rotation direction' means a left tooth surface in FIG. 10. Further, an opposite surface to the third collision surface 17F, e.g., a forward tooth surface of the tooth surfaces of the planetary gear 17 in the rotation direction has the same shape as the tooth surface of the sun gear 15.

3.2.3 Tooth Surface Shape of First Output Gear (Refer to FIG. 10)

When the sun gear 15 is rotated in the direction along which the planetary gear 17 revolves around the sun gear 15 from the four position to the third position, e.g., when the planetary gear 17 and the first output gear 21 are rotated in the reverse direction, a forward tooth surface of the tooth surfaces of the first output gear 21 in the rotating direction is provided with a fourth collision surface 21A consisting of a curved or planar surface having a curvature radius larger than the toothed curve of the sun gear 15.

Incidentally, the 'forward tooth surface of the tooth surfaces of the first output gear 21 in the rotating direction (reverse rotating direction)' means a right tooth surface in FIG. 10.

3.2.4 Tooth Surface Shape of Second Output Gear (Refer to FIG. 11)

A forward tooth surface of the tooth surfaces of the second output gear 23 in the rotating direction is provided with a fifth collision surface 23A consisting of a curved or planar surface having a curvature radius larger than the toothed curve of the sun gear 15.

Incidentally, at the fourth position, e.g., when the driving force is transmitted to the second output gear 23, the planetary gear 17 is rotated in the reverse direction. Therefore, the 'rotating direction of the second output gear 23' means a rotating direction when the planetary gear 17 is rotated in the reverse direction. The 'forward tooth surface of the tooth surfaces of the second output gear 23 in the rotating direction' is a right tooth surface in FIG. 11.

Further, in this exemplary embodiment, all of the first collision surface 19E, the second collision surface 19F, the third collision surface 17F, the fourth collision surface 21A and the fifth collision surface 23A have a planar surface shape and have the same shape.

4. Transmission of Driving Force from Driving Force Transmission Mechanism to Conveyance Mechanism As shown in FIG. 12, the driving force transmitted to the second output gear 23 by the driving force transmission mechanism 13 is transmitted to the conveyance mechanism 11 at least through a first gear 41 and a second gear 42.

That is, when the driving force is transmitted to the conveyance mechanism 11, the first gear 41 is applied with the driving force from the driving force transmission mechanism 13 through the second output gear 23 and is thus rotated. The second gear 42 is rotated with being meshed with the first gear 41 and transmits the driving force to the conveyance mechanism 11.

A rotating center line L1 of the second gear 42 coincides with the swinging center line L2 of at least the hinge mechanism 5A. That is, the extension line of the rotating center line L1 overlaps with the swinging center line L2. Incidentally, in this exemplary embodiment, as shown in FIG. 2, the pair of hinge mechanisms 5A, 5B has the swinging center lines that coincide with each other. Therefore, the rotating center line L1 of the second gear 42 coincides with the swinging center line L2 of any hinge mechanisms 5A, 5B.

Figure 12:
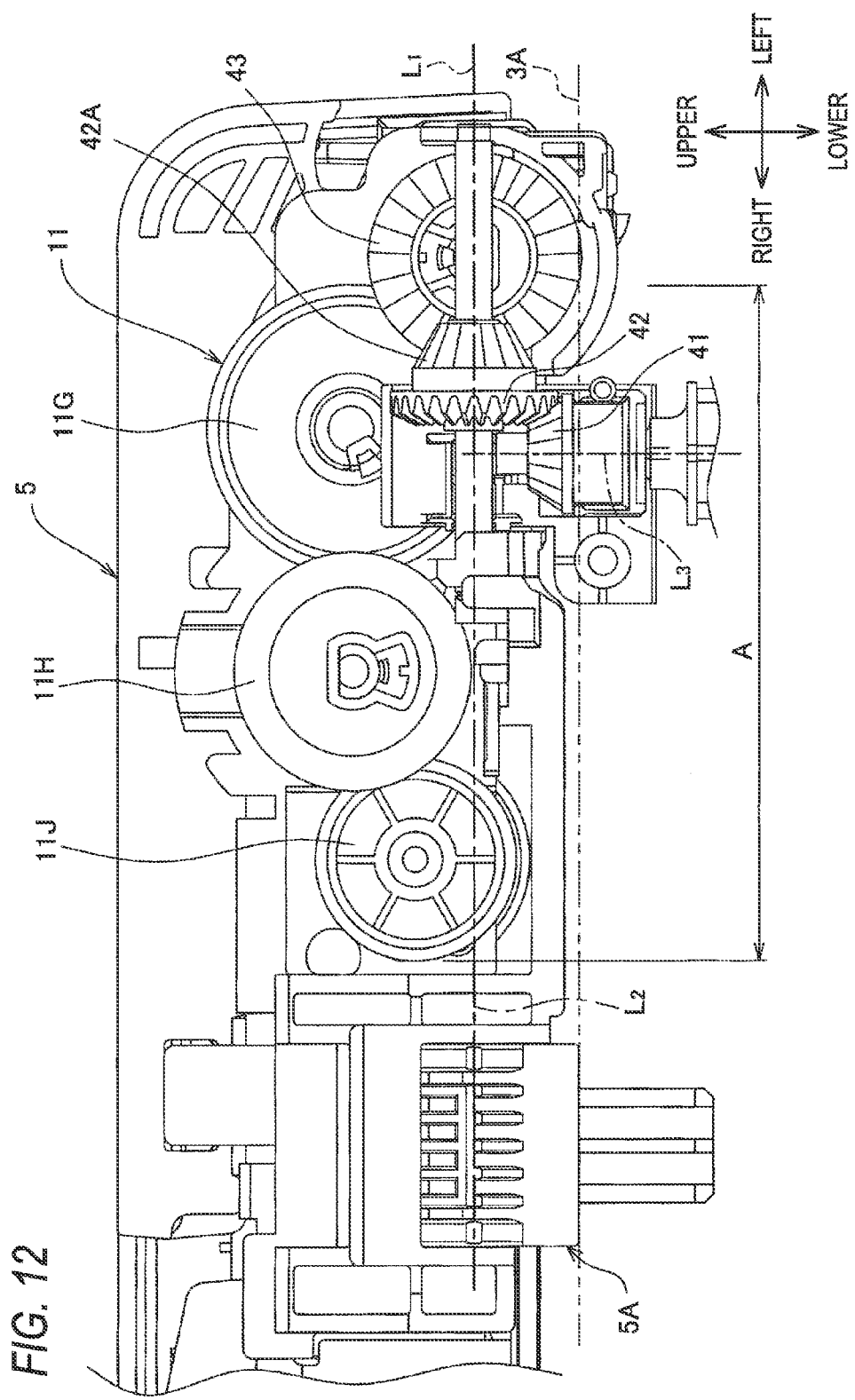
FIG. 12 shows a gear train and the like of the conveyance mechanism 11 according to the exemplary embodiment of the invention.

Further, as shown in FIG. 12, the first gear 41 and the second gear 42 are conical bevel gears. Hence, the rotating direction of the driving force transmitted to the first gear 41 is changed by 90° by the second gear 42.

That is, the swinging center line L2 of the hinge mechanism 5A and the rotating center line L1 of the second gear 42 are parallel with the placing surface 3A. A rotating center line L3 of the first gear 41 is parallel with a direction orthogonal to the placing surface 3A. In this exemplary embodiment, since the placing surface 3A is substantially horizontal, the rotating center line L3 of the first gear 41 is parallel with a vertical direction.

That is, the driving force transmitted to the first gear 41 having a vertical direction as the rotating center is converted into a driving force having a horizontal direction as a rotating center by the second gear 42. Then, as shown in FIG. 13, a direction of the driving force transmitted to the second gear 42 is changed into a direction L4 that is orthogonal to the rotating center line L1 by a third gear 43.

The third gear 43 is a bevel gear configured to transmit the driving force transmitted to the second gear 42 towards the conveyance mechanism 11 and is a gear having a rotating center line L4 orthogonal to the rotating center line L1 of the second gear 42. Incidentally, at a state where the document cover 5 is closed, e.g., at a state shown in FIG. 15, the rotating center line L4 of the third gear 43 is parallel with the placing surface 3A, e.g., a shaft line of the conveying roller 11A.

Figure 13:
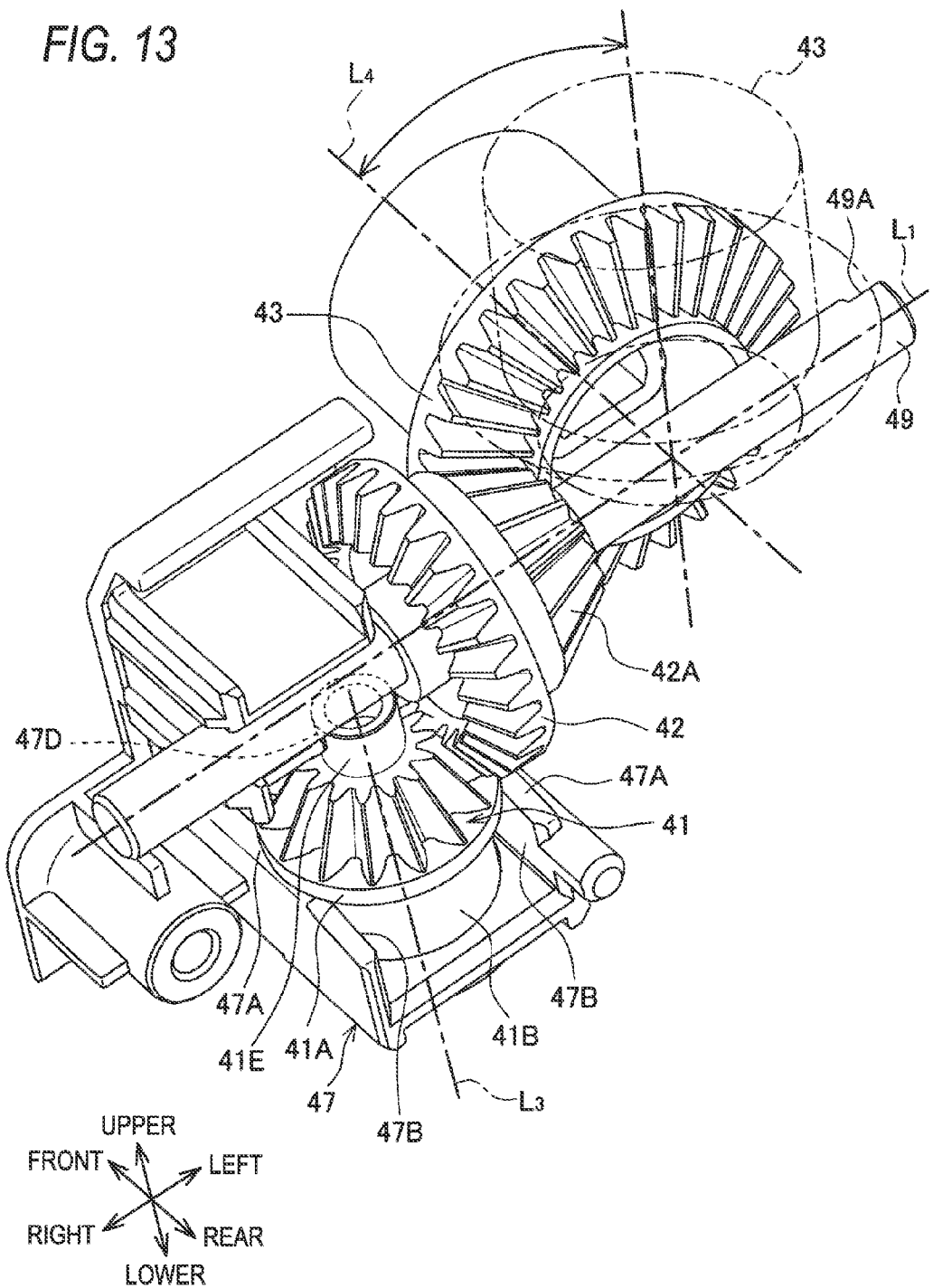
FIGS. 13 to 15 show a transmission mechanism of a driving force from the driving force transmission mechanism 13 to the conveyance mechanism 11.

Incidentally, in this exemplary embodiment, as shown in FIG. 13, the third gear 43 is not directly meshed with the second gear 42 and is indirectly meshed with the second gear 42. Specifically, a backside of the second gear 42 is provided with a bevel gear 42A that is integrally rotated with the second gear 42 about the rotating center line L1 serving as the rotating center line. The third gear 43 is meshed with the bevel gear 42A and is thus applied with the driving force from the second gear 42.

Incidentally, as shown in FIG. 12, the driving force whose rotating direction has been changed by the third gear 43 is transmitted to a plurality of gears 11G to 11J arranged in a direction parallel with the rotating center line L1 of the second gear 42. The gears 11G to 11J are gears transmitting the driving force to the respective rollers 11C to 11F configuring the conveyance mechanism 11.

Further, the gears 11G to 11J are gears having rotating centers parallel with the rotating center line L4 of the third gear 43. The first gear 41 is arranged at a part corresponding to a range A, in which the gears 11G to 11J are provided, in the direction parallel with the rotating center line L1 of the second gear 42.

Further, the first gear 41 and the second gear 42 are provided at a position closer to an end-side of the document platen 3 than the hinge mechanism 5A in the direction parallel with the swinging center line L2, e.g., in an area of the second reading window 3C-side relative to the hinge mechanism 5A.

Further, at least at the state where the document platen 5 is closed, the third gear 43 is positioned at a part that will be described later. That is, regarding the direction parallel with the placing surface 3A and orthogonal to the rotating center line L1, the third gear 43 is provided at a position closer to the placing surface 3A than the rotating center line L1 of the second gear 42, e.g., at the front of the rotating center line L1 in the image reading apparatus 1.

Further, the swinging center line L2 of the hinge mechanism 5A and the rotating center line L1 of the second gear 42 are deviated towards the document cover 5 from the placing surface 3A. That is, in this exemplary embodiment, the swinging center line L2 of the hinge mechanism 5A and the rotating center line L1 of the second gear 42 are higher than the placing surface 3A.

Figure 14:
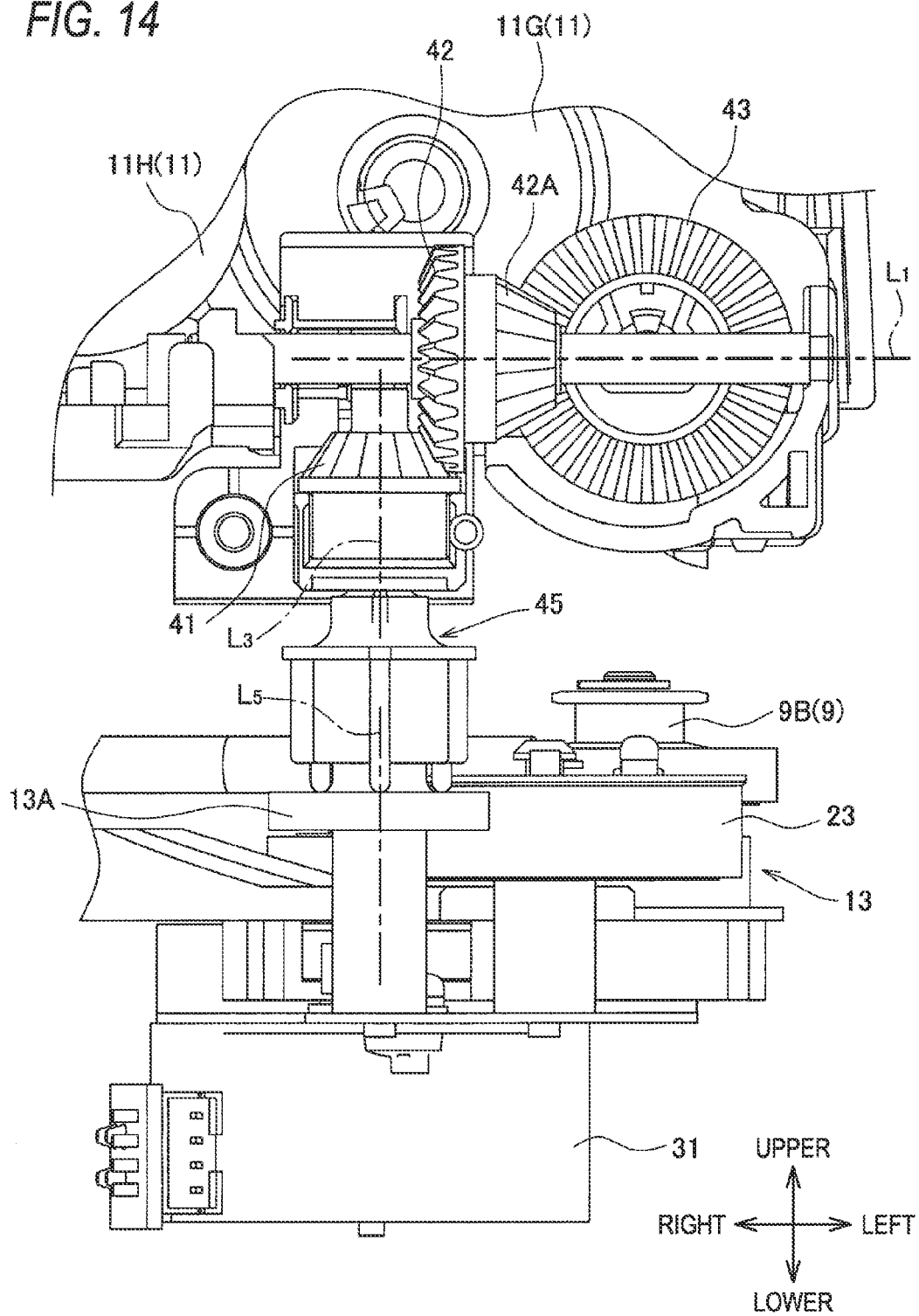

As shown in FIG. 14, the driving force is transmitted to the first gear 41 from an output part 13A of the driving force transmission mechanism 13 through a joint part 45. The second output gear 23 is coupled to the output part 13A. The joint part 45 is configured by a universal joint capable of absorbing the deviation of the rotating center line L5 of the output part 13A relative to the rotating center line L3 of the first gear 41. The joint part 45 will be specifically described later.

5. Mounting Structure of First Gear and Second Gear

As shown in FIG. 13, the first gear 41 is rotatably supported by a first support part 47. The first support part 47 has at least a thrust bearing surface 47A, first radial bearing surfaces 47B and a second radial bearing surface 47D.

The thrust bearing surface 47A is slidingly contacted to a bearing surface 41A provided to a larger diameter-side of the first gear 41. Thus, the thrust bearing surface 47A is applied with load of a direction parallel with the rotating center line L3, which load is a part of loads applied to the first gear 41, and restrains the first gear 41 from being moved in the corresponding direction.

The first radial bearing surfaces 47B are slidingly contacted to a circumferential surface 41B provided to a backside of the first gear 41. The first radial bearing surfaces 47B are provided at both sides in a direction orthogonal to the rotating center line L3 with the circumferential surface 41B being interposed therebetween. The second radial bearing surface 47D is slidingly contacted to a circumferential surface 41E provided on the tooth surface-side of the first gear 41. That is, the second radial bearing surface 47D is a sliding contact surface having a semi-circumference shape following the circumferential surface 41E.

Therefore, the first radial bearing surfaces 47B and the second radial bearing surface 47D are applied with load of a direction orthogonal to the rotating center line L3, which load is a part of loads applied to the first gear 41, and restrains the first gear 41 from being moved in the corresponding direction. Incidentally, in this exemplary embodiment, the 'direction orthogonal to the rotating center line L3' coincides with a direction parallel with the rotating center line L1.

The second gear 42 is supported by a second support part 49. In this exemplary embodiment, the second support part 49 is a shaft that coincides with the rotating center line L1 of the second gear 42 and is mounted to the document cover 5. Incidentally, the second support part 49 is a metallic rod penetrating the second gear 42, for example.

Further, the second support part 49 is mounted to the document cover 5. Incidentally, the second support part 49 is mounted to the document cover 5 so as not to be movable relative to the document cover 5 by a planar part 49A provided to one end-side thereof in a shaft line direction. Thus, the second gear 42 is rotated with sliding contacting an outer periphery of the second support part 49.

Figure 15:
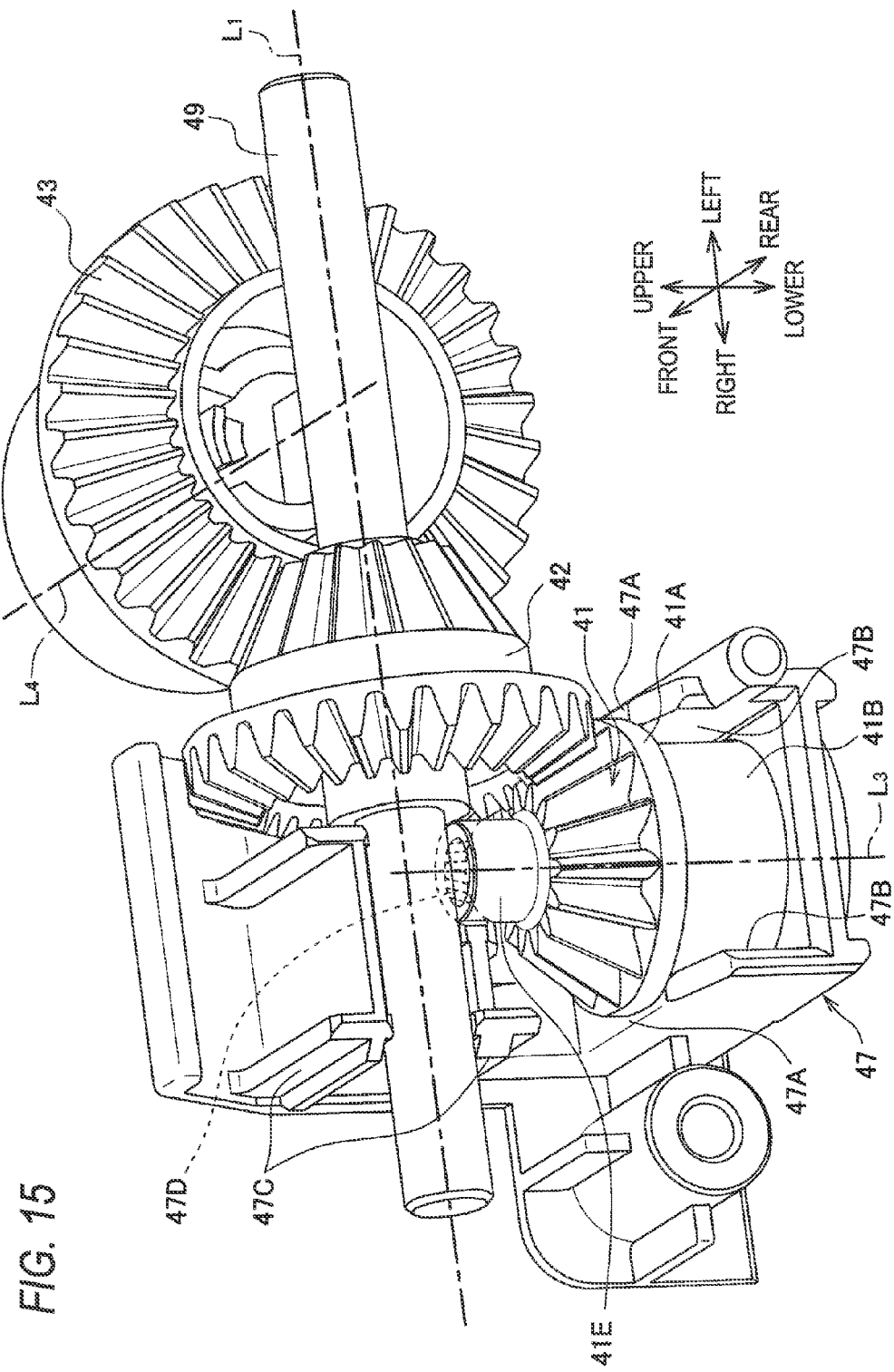

On the other hand, the first support part 47 is mounted to the second support part 49. Specifically, as shown in FIG. 15, the first support part 47 is mounted to the shaft configuring the second support part 49 with being suspended therefrom. That is, an upper part of the first support part 47 is provided with holding parts 47C sandwiching the second support part 49 in the upper-lower direction.

The holding parts 47C, the thrust bearing surface 47A and the first radial bearing surfaces 47B are integrated with the first support part 47. Hence, an assembly operator can attach and detach the first support part 47 to and from the second support part 49 with the first gear 41 being supported to the first support part 47.

Incidentally, the holding parts 47C, the thrust bearing surface 47A and the first radial bearing surfaces 47B are integrally formed with the first support part 47 by a resin such as POM and the like. Further, the third gear 43 is mounted to the document cover 5 through a third support part (not shown). Incidentally, the third support part is a member having two types of bearing surfaces, which is the same as the first support part 47.

6. Joint Part

In this exemplary embodiment, the joint part 45 is a universal joint of a constant joint type, as shown in FIGS. 16A to 16D.

Figure 16:
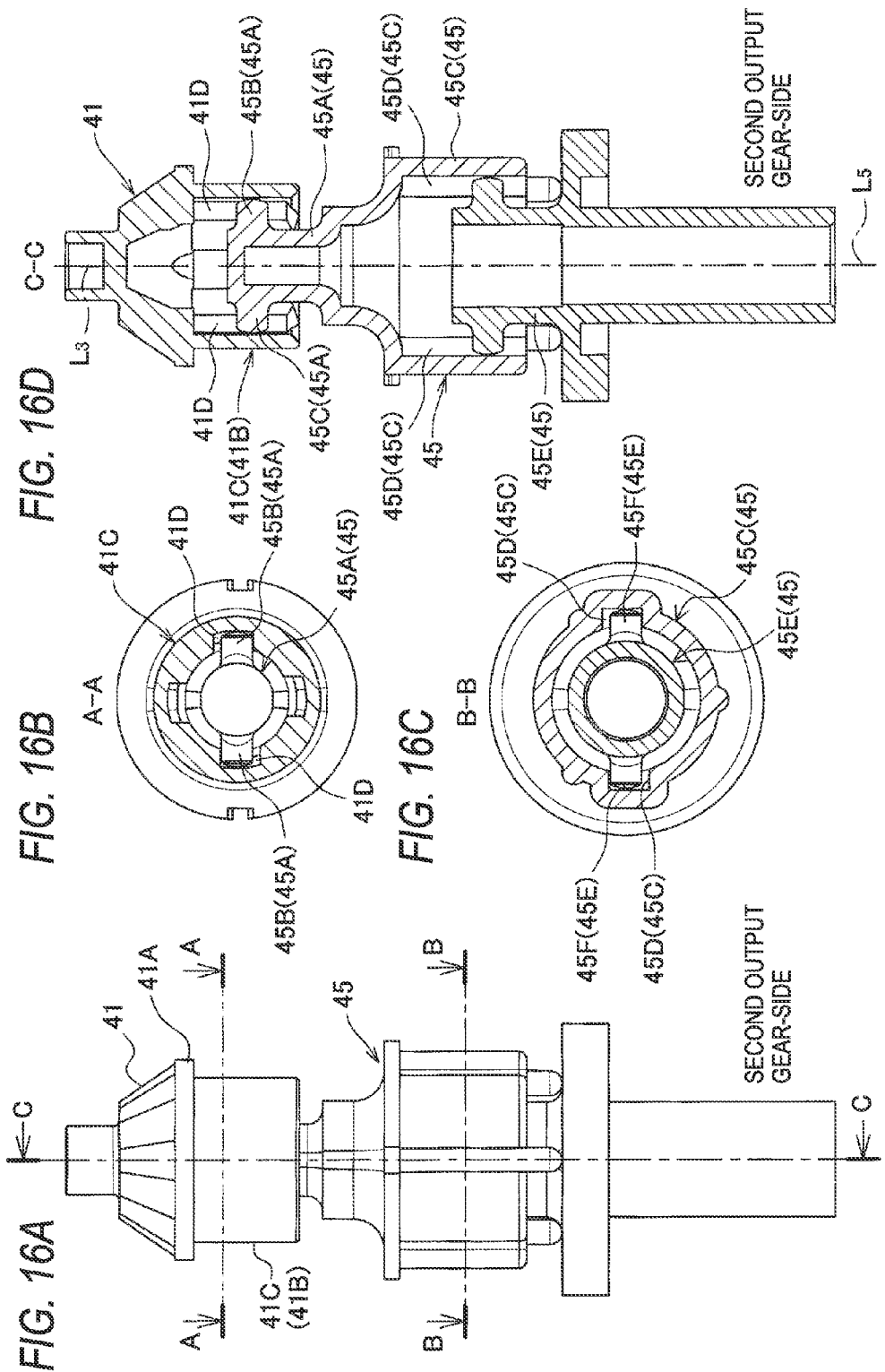
FIG. 16A is a front view showing a joint part 45 and the like, FIG. 16B is an A-A sectional view of FIG. 16A.
FIG. 16C is a B-B sectional view of FIG. 16A.
FIG. 16D is a C-C sectional view of FIG. 16A.

That is, as shown in FIG. 16A, the backside of the first gear 41 is integrally formed with a cylindrical part 41C having the circumferential surface 41B on the outer periphery thereof. As shown in FIG. 16D, an inner periphery of the cylindrical part 41C is formed with at least two recess portions 41D extending in a direction parallel with the rotating center line L3 of the first gear 41.

As shown in FIG. 16B, the two recess portions 41D are formed so that they are deviated from each other by 180°, for example, in a circumferential direction. A first part 45A of the joint part 45 is inserted in the cylindrical part 41C. An outer periphery of the first part 45A is provided with first protrusions 45B that protrude to an inner periphery of the cylindrical part 41C and are slidably fitted in the respective recess portions 41D.

As shown in FIG. 16D, a cylindrical part 45C that is integrally rotated with the first part 45A is provided at the second output gear 23-side, rather than the first part 45A. An inner periphery of the cylindrical part 45C is provided with at least two recess portions 45D that extend in a direction parallel with the rotating center line L5 of the output part 13A.

As shown in FIG. 16C, the two recess portions 45D are formed so that they are deviated from each other by 180°, for example, in a circumferential direction. A second part 45E of the joint part 45 is inserted in the cylindrical part 45C. An outer periphery of the second part 45E is provided with first protrusions 45F that protrude to an inner periphery of the cylindrical part 45C and are slidably fitted in the respective recess portions 45D.

Therefore, the first protrusions 45B are engaged with the recess portions 45D while being displaced in a longitudinal direction of the recess portions 41D. Likewise, the second protrusions 45F are engaged with the recess portions 45D while being displaced in a longitudinal direction of the recess portions 45D. Hence, the joint part 45 transmits the driving force from the output part 13A to the first gear 41 while absorbing the deviation of the rotating center line L5 of the output part 13A relative to the rotating center line L3 of the first gear 41.

Figure 17:
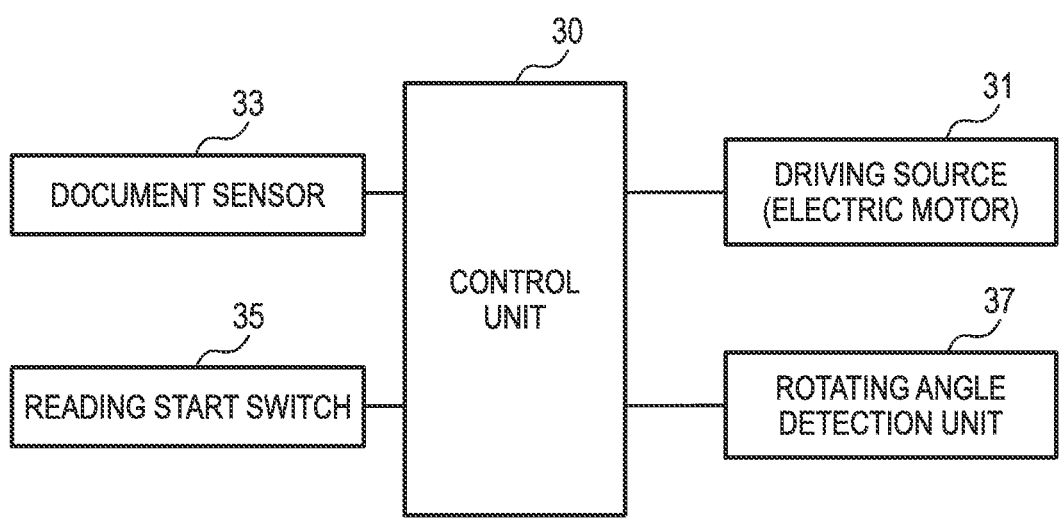
FIG. 17 is a block diagram showing a control system of a driving source 31 according to the exemplary embodiment of the invention.

7. Control of Driving Source (Refer to FIG. 17)

The driving source 31 is configured to supply the driving force to the driving force transmission mechanism 13, e.g., to the sun gear 15. The forward rotation, the reverse rotation and the stopping of the driving source 31 are controlled by the control unit 30. The control unit 30 is configured by a microcomputer having a CPU, a ROM, a RAM and the like.

A program for controlling operations of the driving unit 31, a necessary integer and the like are stored in a non-volatile storage unit such as ROM. The CPU reads out the program from the non-volatile storage unit, thereby enabling the control unit 30 to function.

A document sensor 33 is configured to output a signal, which indicates whether a document is placed on the document tray 11A, to the control unit 30. A reading start switch 35 is an operation unit that is operated by a user, and is configured to output a starting signal to the control unit 30 when it is operated by the user. A rotating angle detection unit 37 is configured to detect a rotating angle of the driving source 31 and outputs the detected rotating angle to the control unit 30.

When the reading start switch 35 is operated at a state where a document is placed on the document tray 11A, the control unit 30 executes a reading operation by the conveyed document reading function. On the other hand, when the reading start switch 35 is operated at a state where a document is not placed on the document tray 11A, the control unit 30 executes a reading operation by the placed document reading function.

8. Operations of Driving Force Transmission Mechanism 8.1 When Placed Document Reading Function Operates (Refer to FIG. 6)

When the image reading apparatus 1 is not operated, the imaging unit 7 is located at the standby position and the planetary gear 17 is located at the third position. When the reading start switch 35 is operated by a user and a reading operation is thus activated by the placed document reading function, the control unit 30 rotates the driving source 31 in the forward direction, thereby rotating the sun gear 15 in the forward direction.

Thereby, the imaging unit 7 is moved from the standby position towards the second position, e.g., from the first position towards the second position. At this time, the planetary gear 17 is applied with a revolution force in a direction from the fourth position towards the third position. However, since the second stopper part 3H and the second contacted part 17B are contacted to each other, the planetary gear 17 stays at the third position and rotates on its own axis in the forward direction without revolving around the sun gear 15.

When a detected angle of the rotating angle detection unit 37 reaches a predetermined angle, the control unit 30 rotates the driving source 31 in the reverse direction, thereby rotating the sun gear 15 in the reverse direction. Further, when it is determined that the imaging unit 7 reaches the standby position, the control unit 30 stops the driving source 31. Thereby, the imaging unit 7 is moved from the second position to the standby position.

When the sun gear 15 is rotated in the reverse direction, the planetary gear 17 is applied with a revolution force in a direction from the third position towards the fourth position, e.g., a revolution force in a direction of separating the planetary gear 17 from the first output gear 21. However, the revolution force is cancelled by the first spring 17D, so that the planetary gear 17 stays at the third position and rotates on its own axis in the reverse direction without revolving around the sun gear 15.

Figure 7:
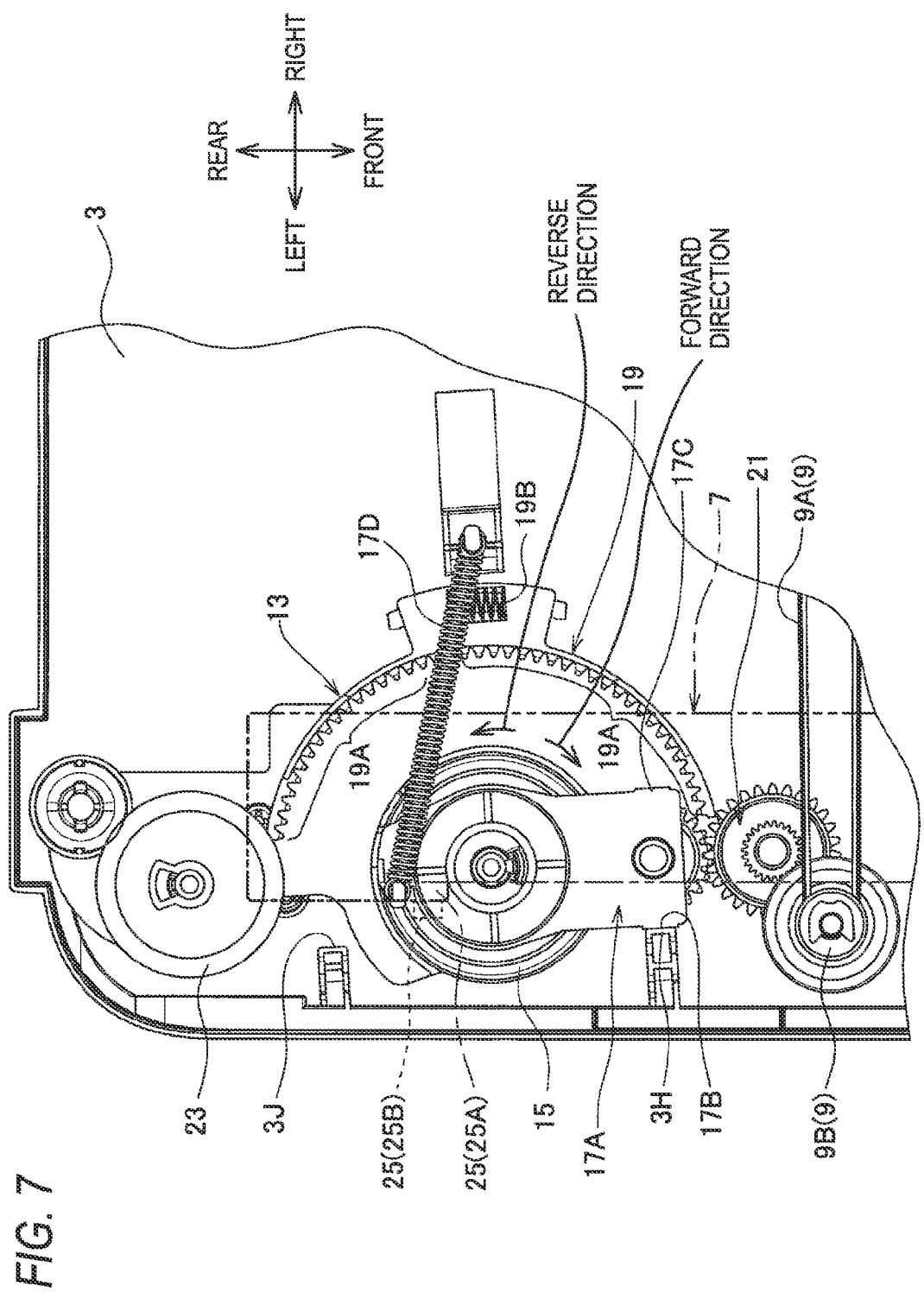
Figure 8:
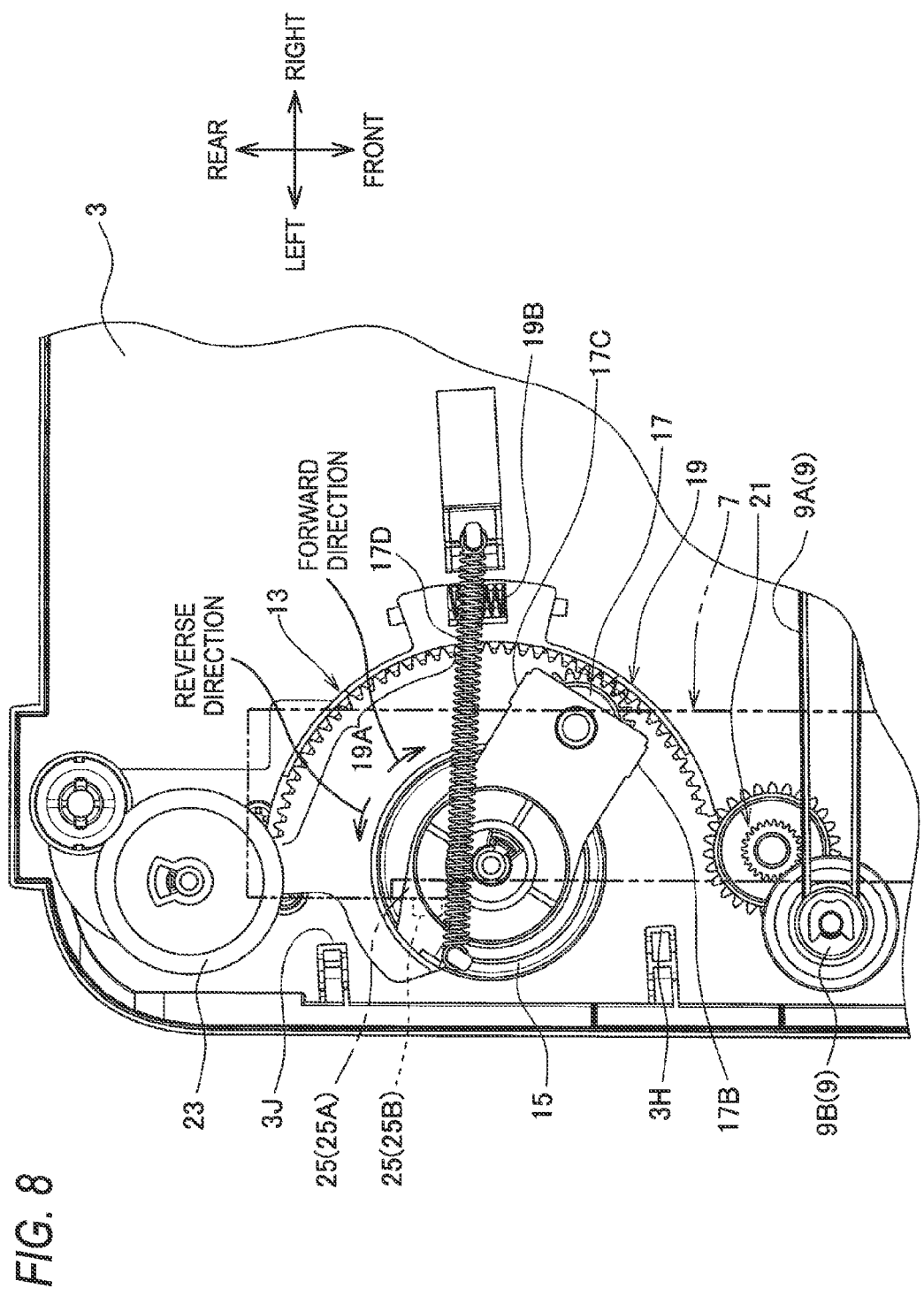

8.2 When Conveyed Document Reading Function Operates (Refer to FIGS. 7 to 9)

When the image reading apparatus 1 is not operated, the imaging unit 7 is located at the standby position and the planetary gear 17 is located at the third position. When the reading start switch 35 is operated by a user and a reading operation is thus activated by the conveyed document reading function, the control unit 30 rotates the driving source 31 in the reverse direction, thereby rotating the sun gear 15 in the reverse direction.

Thereby, as shown in FIG. 7, the imaging unit 7 is moved from the standby position towards the first position. When the imaging unit 7 is located at the first position and the first stopper part 25B and the first contacted part 25A are thus contacted to each other, the moving of the imaging unit 7 is restrained, so that the rotational resistance of the first output gear 21 is increased.

Therefore, the rotation of the planetary gear 17 is interrupted and the rotation force is decreased. On the other hand, the revolution force enabling the planetary gear 17 to revolve around the sun gear 15 from the third position towards the fourth position is increased. When the revolution force is beyond the first restraint force of the first spring 17D, the planetary gear 17 and the internally-toothed gear 19 are meshed, so that the planetary gear 17 starts to revolve around the sun gear 15 towards the fourth position, as shown in FIG. 8.

When the planetary gear 17 revolves around the sun gear 15 and the third stopper part 3J and the third contacted part 17C are thus contacted to each other, the revolution of the planetary gear 17 is stopped and the planetary gear 17 is meshed with the second output gear 23, as shown in FIG. 9. Therefore, the driving force is transmitted to the conveyance mechanism 11 and the document starts to be conveyed.

Further, when it is determined that the reading operation by the conveyed document reading function is completed, the control unit 30 rotates the driving source 31 in the forward direction, thereby rotating the sun gear 15 in the forward direction. Thereby, the planetary gear 17 is applied with a revolution force in a direction from the fourth position towards the third position.

When the revolution force exceeds the second restraint force of the first spring 17D, the planetary gear 17 revolves around the sun gear 15 towards the third position, as shown in FIG. 6. When the planetary gear 17 is located at the third position, the planetary gear 17 is meshed with the first output gear 21, so that the imaging unit 7 is moved from the first position towards the basis position. Thus, the control unit 30 stops the driving source 31 when the imaging unit 7 reaches the basis position.

9. Features of Image Reading Apparatus in this Exemplary Embodiment 9.1 Driving Force Transmission Mechanism In this exemplary embodiment, as described above, the planetary gear mechanism having the sun gear 15, the planetary gear 17, the meshing part 19 and the like is provided and the rotating direction of the sun gear 15 is switched to switch the transmission of the driving force.

When the planetary gear 17 revolves around the sun gear 15 with being spaced from the first output gear 21 and the second output gear 23, the load interrupting the rotation of the planetary gear 17 becomes small and the rotation force exceeds the revolution force, so that the revolution may be stopped.

However, in this exemplary embodiment, the arm 17A and the side of the planetary gear 17 are slidingly contacted to each other. Thus, when the planetary gear 17 rotates on its own axis, a frictional force suppressing the rotation is generated. Therefore, when the planetary gear 17 revolves around the sun gear 15 with being spaced from the first output gear 21 and the second output gear 23, the revolution of the planetary gear 17 is not stopped.

When the sun gear 15 is rotated in the reverse direction at a state where the planetary gear 17 is meshed with the first output gear 21, torque of the revolution force applied to the planetary gear 17 is opposite to torque by the first restraint force of the first spring 17D.

Therefore, when the first restraint force is small, the planetary gear 17 revolves around the sun gear 15 and is thus spaced from the first output gear 21, so that it is not possible to move the imaging unit 7 from the second position towards the first position. On the other hand, when the first restraint force is large, the rotation force of the planetary gear 17 is increased and a tooth jump phenomenon may occur between the belt 9A having a tooth and the pulley 9B having a first tooth.

Thus, in this exemplary embodiment, torque with which the first spring 17D restrains the revolution of the planetary gear 17 at the third position is set to be greater than rotational resistance torque of the first output gear 21 and to be smaller than driving torque of the first output gear 21 when a tooth jump phenomenon occurs between the belt 9A having a tooth and the pulley 9B having a first tooth.

Further, in this exemplary embodiment, the internally-toothed gear 19 can move relative to the sun gear 15. Thereby, when the planetary gear 17 is spaced from the first output gear 21 or second output gear 23 and is meshed with the internally-toothed gear 19, it is possible to enable the planetary gear 17 and the internally-toothed gear 19 to be smoothly meshed with each other.

That is, the protrusions configuring the teeth of the planetary gear 17 and the protrusions 19A configuring the internally-toothed gear 19 may collide with each other, depending on timing at which the planetary gear 17 is spaced from the first output gear 21 or second output gear 23, so that the planetary gear 17 and the internally-toothed gear 19 may not be meshed with each other.

However, in this exemplary embodiment, when the protrusions configuring the teeth of the planetary gear 17 and the protrusions 19A configuring the internally-toothed gear 19 collide with each other, the internally-toothed gear 19 is moved. Therefore, the planetary gear 17 and the internally-toothed gear 19 are smoothly meshed with each other.

Further, in this exemplary embodiment, the protrusions 19A are provided with the first collision surfaces 19E and the second collision surfaces 19F.

Thereby, in this exemplary embodiment, when the planetary gear 17 and the internally-toothed gear 19 are meshed with each other, the protrusions configuring the teeth of the planetary gear 17 collide with the first collision surfaces 19E or second collision surfaces 19F.

Therefore, since the protrusions of the planetary gear 17 easily slide relative to the first collision surfaces 19E or second collision surfaces 19F, it is possible to enable the planetary gear 17 and the internally-toothed gear 19 to be smoothly meshed with each other when the planetary gear 17 revolves around the sun gear 15.

Further, in this exemplary embodiment, the planetary gear 17 is provided with the third collision surfaces 17F. Thereby, the protrusions of the planetary gear 17 or protrusions configuring the first output gear 21 easily slide relative to the other protrusions. Therefore, it is possible to enable the planetary gear 17 and the first output gear 21 to be smoothly meshed with each other when the planetary gear 17 revolves around the sun gear 15.

Further, in this exemplary embodiment, the first output gear 21 is provided with the fourth collision surfaces 21A. Thereby, in this exemplary embodiment, the protrusions of the planetary gear 17 or protrusions configuring the first output gear 21 easily slide relative to the other protrusions. Therefore, it is possible to enable the planetary gear 17 and the first output gear 21 to be smoothly meshed with each other when the planetary gear 17 revolves around the sun gear 15.

Further, when the planetary gear 17 and the first output gear 21 are meshed by tooth surfaces having no collision surface (hereinafter, which is referred to as a normal meshed state), a pulsation that is generated in the driving force to be transmitted from the planetary gear 17 to the first output gear 21 is decreased.

Therefore, when the planetary gear 17 and the first output gear 21 are configured to be at the normal meshed state upon reading of an image, like this exemplary embodiment, it is possible to suppress a quality of a read image from being deteriorated.

Further, in this exemplary embodiment, the second output gear 23 is provided with the fifth collision surfaces 23A. Thereby, in this exemplary embodiment, the protrusions of the planetary gear 17 or protrusions configuring the second output gear 23 easily slide relative to the other protrusions. Therefore, it is possible to enable the planetary gear 17 and the second output gear 23 to be smoothly meshed with each other when the planetary gear 17 revolves around the sun gear 15.

9.2 Transmission of Driving Force from Driving Force Transmission Mechanism to Conveyance Mechanism In this exemplary embodiment, the rotating center line L1 of the second gear 42 coincides with the swinging center line L2 of the hinge mechanism 5A.

Thereby, it is possible to swing the document cover 5 at a state where the first gear 41 and the second gear are meshed with each other. That is, in this exemplary embodiment, it is possible to transmit the driving force all the time, irrespective of the position of the document cover 5.

That is, since the shaft configuring the second support part 49 coincides with the swinging center line L2, the second gear 42 keeps meshing with the first gear 41, even though the document cover 5 swings about the swinging center line L2 serving as the swinging center, as shown in FIG. 13.

On the other hand, the third gear 43 is mounted to the document cover 5. Therefore, when the document cover 5 swings, the third gear 43 swings about the rotating center line L1 serving as the swinging center with being meshed with the bevel gear 42A at a state where the rotating center line L3 is orthogonal to the rotating center line L1.

Incidentally, a dashed-two dotted line in FIG. 13 indicates a position of the third gear 43 when the document cover 5 is opened. A solid line indicates a position of the third gear 43 when the document cover 5 is closed. The positions of the first gear 41 and the second gear 42 are not changed, irrespective of the position of the document cover 5.

Further, in this exemplary embodiment, the first gear 41 and the second gear 42 are the conical bevel gears. Thereby, in this exemplary embodiment, it is possible to effectively transmit the driving force without enlarging the gear mechanism.

Further, in this exemplary embodiment, the swinging center line L2 of the hinge mechanism 5A and the rotating center line L1 of the second gear 42 are parallel with the placing surface 3A. The rotating center line L3 of the first gear 41 is parallel with the direction orthogonal to the placing surface 3A. Further, the third gear 43 that is a bevel gear transmitting the driving force transmitted to the second gear 42 towards the conveyance mechanism 11 and has the rotating center line L4 orthogonal to the rotating center line L1 of the second gear 42 is provided. That is, in this exemplary embodiment, the direction of the driving force is changed twice by at least three types of the bevel gears.

Further, in this exemplary embodiment, the joint part 45 is provided which transmits the driving force from the output part 13A of the driving force transmission mechanism 13 to the first gear 41 and can absorb the deviation of the rotating center line L5 of the output part 13A relative to the rotating center line L3 of the first gear 41. Thereby, even when the position of the document cover 5 relative to the document platen 3 is deviated, the deviation can be absorbed by the joint part 45.

Further, in this exemplary embodiment, the second support part 49 is mounted to the document platen 3 and the first support part 47 is mounted to the second support part 49. Thereby, the first gear 41 and the second gear 42 are mounted on the basis of the same member.

Therefore, it is possible to easily improve positional precision of the second gear 42 relative to the first gear 41. Further, since it is possible to enable the first gear 41 and the second gear 42 to be favorably meshed with each other, it is possible to effectively transmit the driving force.

Further, in this exemplary embodiment, the third gear 43 is located at the placing surface 3A-side, rather than the rotating center line L1 of the second gear 42, at least when the document cover 5 is closed.

If the third gear 43 is located at an opposite side to the placing surface 3A, rather than the rotating center line L1 of the second gear 42, it is necessary to separately provide a transmission mechanism that guides the driving force transmitted to the third gear 43 to the placing surface 3A-side, rather than the rotating center line L1 of the second gear 42. However, in this exemplary embodiment, since the transmission mechanism is not required, it is possible to suppress an external size of the image reading apparatus 1, e.g., the image forming apparatus 100 from being enlarged in the front-rear direction.

Further, in this exemplary embodiment, the restraint part 5C restrains the swinging center line L2 of the hinge mechanism 5A from being displaced relative to the document platen 3. Thereby, it is possible to suppress the document cover 5 from finely vibrating when the driving force is being transmitted to the conveyance mechanism 11.

Therefore, it is possible to enable the first gear 41 and the second gear 42 to be favorably meshed with each other, so that it is possible to effectively transmit the driving force and to improve the reading precision of an image.

Further, in this exemplary embodiment, the joint part 45 is a universal joint. Thereby, it is possible to transmit the driving force more effectively, compared to a joint using an elastic member such as a rubber tube and the like.

Further, in this exemplary embodiment, the first gear 41 and the second gear 42 are provided at the end portion-side of the document platen 3, rather than the hinge mechanism 5A, in the direction parallel with the swinging center line L2. Thereby, it is possible to suppress the image reading apparatus 1, e.g., the image forming apparatus 100 from being enlarged and to effectively transmit the driving force.

That is, typically, the reading unit for the conveyed document reading function is provided at the end portion-side of the document platen 3. Therefore, if the hinge mechanism 5A is provided at the end portion-side of the document platen 3, rather than the first gear 41 and the second gear 42, in the direction parallel with the swinging center line L2, it is necessary to separately provide a transmission mechanism that transmits the driving force from the second gear 42 to the end portion-side of the document platen 3.

However, the above-described exemplary embodiment does not require such a transmission mechanism. Therefore, it is possible to suppress the image reading apparatus 1, e.g., the image forming apparatus 100 from being enlarged and to effectively transmit the driving force.

Modifications to Exemplary Embodiments

In the above-described exemplary embodiment, the driving force transmission mechanism 13 is configured by the planetary gear mechanism including the sun gear 15, the planetary gear 17, the meshing part 19 and the like. However, the invention is not limited thereto. For example, the transmission path of the driving force may be switched using an actuator such as a solenoid and the like.

Further, in the above-described exemplary embodiment, all of the first collision surface 19E, the second collision surface 19F, the third collision surface 17F, the fourth collision surface 21A and the fifth collision surface 23A are the planar surfaces and have the same shape. However, the invention is not limited thereto. For example, all or any one of the first to fifth collision surfaces 19E to 23A may be curved.

In the above-described exemplary embodiment, the first to fifth collision surfaces 19E to 23A are provided. However, the invention is not limited thereto. For example, at least one of the first to fifth collision surfaces 19E to 23A may be omitted.

In the above-described exemplary embodiment, the protrusion 19A has the configuration where the first protrusion 19C and the second protrusion 19D have the same shape, and the other protrusions 19A have the same tooth surface shape as the sun gear 15. However, the invention is not limited thereto. For example, all the protrusions 19A may be made to be the same as the first protrusion 19C or second protrusion 19D.

In the above-described exemplary embodiment, the first protrusion 19C is provided at both sides with the first collision surfaces 19E that are symmetric. However, the invention is not limited thereto. For example, it is sufficient that the first collision surface 19E is provided to at least a side (a left side of the first protrusion 19C, in FIG. 10), which faces the first output gear 21, of the tooth surfaces of the first protrusion 19C.

In the above-described exemplary embodiment, the second protrusion 19D is provided at both sides with the second collision surfaces 19F that are symmetric. However, the invention is not limited thereto. For example, it is sufficient that the second collision surface 19F is provided to at least a side (a left side of the second protrusion 19D, in FIG. 11), which faces the first output gear 21, of the tooth surfaces of the second protrusion 19D.

In the above-described exemplary embodiment, the meshing part 19 is the internally-toothed gear 19 having the plurality of protrusions 19A. However, the invention is not limited thereto. For example, the meshing part 19 with which the protrusions of the planetary gear 17 of rubber, sponge and the like bite and are thus meshed or meshing part 19 consisting of only one protrusion 19A is also possible.

In the above-described exemplary embodiment, the load generation part has the configuration where the first stopper part 25B and the first contacted part 25A are contacted. However, the invention is not limited thereto. For example, the load generation part may have a configuration of restraining the first output gear 21 or another gear, which is rotated in conjunction with the first output gear 21, from being rotated.

The moving mechanism 9 and the conveyance mechanism are not limited to the configurations in the above-described exemplary embodiment and may adopt other configurations.

In the above-described exemplary embodiment, the planetary gear 17 is supported via the arm 17A. However, the invention is not limited thereto. For example, a configuration is also possible in which a shaft of the planetary gear 17 is slidably inserted into a circular arc-shaped long hole following the revolution path L1.

In the above-described exemplary embodiment, the driving source 31 is rotated in the forward and reverse directions, thereby rotating the sun gear 15 in the forward and reverse directions. However, the invention is not limited thereto. For example, a configuration is also possible in which the transmission path of the driving force from the driving source 31 to the sun gear 15 is switched using a solenoid and the like, thereby rotating the sun gear 15 in the forward and reverse directions with the driving source 31 being rotated in one direction.

In the above-described exemplary embodiment, the rotary shaft directions of the sun gear 15, the planetary gear 17, the first output gear 21 and the second output gear 23 are orthogonal to the placing surface 3A. However, the invention is not limited thereto. For example, any one rotary shaft direction may be parallel with the placing surface 3A.

In the above-described exemplary embodiment, the meshing part 19 can be moved along the revolution direction of the planetary gear 17. However, the invention is not limited thereto. For example, a configuration where the meshing part 19 can be moved in a radial direction of the sun gear 15 or configuration where the meshing part 19 cannot be moved is also possible.

In the above-described exemplary embodiment, the first output gear 21 is provided at the opposite side to the second output gear 23 with the sun gear 15 being interposed therebetween. However, the invention is not limited thereto.

In the above-described exemplary embodiment, the CIS is used as the imaging unit 7. However, the invention is not limited thereto. For example, a CCD may be used as the imaging unit 7.

In the above-described exemplary embodiment, the first gear 41 to the third gear 43 are the bevel gears. However, the invention is not limited thereto. For example, the first gear 41 and the second gear 42 may consist of a worm and a worm wheel.

In the above-described exemplary embodiment, the driving source 31 and the driving force transmission mechanism 13 are provided to the document platen 3. However, the invention is not limited thereto. For example, the driving source 31 and the driving force transmission mechanism 13 may be provided to the document cover 5.

Incidentally, when the driving source 31 and the driving force transmission mechanism 13 are provided to the document cover 5, the driving force is transmitted to not the conveyance mechanism 11 but the moving mechanism 9 provided to the document platen 3 through the second gear 42.

Thus, describing the driving force transmission with the configuration of the above-described exemplary embodiment, the driving force from the driving source 31 is transmitted in order of the third gear 43, the second gear 42 and the first gear 41 through the driving force transmission mechanism 13. Then, the driving force transmitted to the first gear 41 is transmitted to the moving mechanism 9 through a transmission mechanism (not shown) such as a gear train and the like.

That is, when the driving source 31 and the driving force transmission mechanism 13 are provided to the document cover 5, the third gear 43 of the above-described exemplary embodiment corresponds to the 'first gear'. The driving force is transmitted from the 'third gear 43 corresponding to the first gear' to the second gear.

In the above-described exemplary embodiment, the rotating direction of the driving force output from the driving force transmission mechanism 13 is changed twice. However, the invention is not limited thereto. For example, the rotating direction may be changed three or more times.

In the above-described exemplary embodiment, the bevel gear 42A provided on the backside of the second gear 42 is meshed with the third gear 43. However, the invention is not limited thereto. For example, the second gear 42 and the third gear 43 may be meshed with each other.

In the above-described exemplary embodiment, the swinging center line L2 of the hinge mechanism 5A and the rotating center line L1 of the second gear 42 are located at the positions deviating towards the document cover 5 relative to the placing surface 3A. However, the invention is not limited thereto. For example, the rotating center line L1 and the swinging center line L2 may be located at positions opposite to the document cover 5 relative to the placing surface 3A, for example positions deviating towards the below side of the placing surface 3A.

In the above-described exemplary embodiment, the joint part 45 configured by the universal joint is provided. However, the invention is not limited thereto. For example, the joint part 45 may be omitted or may be configured by an elastic member such as rubber tube and the like.

In the above-described exemplary embodiment, the first support part 47 is mounted to the second support part 49. However, the invention is not limited thereto. For example, the second support part 49 may be mounted to the first support part 47.

In the above-described exemplary embodiment, the second support part 49 is mounted to the document cover 5. However, the invention is not limited thereto. For example, the second support part 49 may be mounted to the document platen 3.

In the above-described exemplary embodiment, the second support part 49 has the shaft shape. However, the invention is not limited thereto. For example, the second support part 49 may have the same configuration as the first support part 47.

In the above-described exemplary embodiment, the first support part 47 is detachably mounted to the second support part 49 with the first gear 41 being mounted to the first support part 47. However, the invention is not limited thereto. For example, the first support part 47 and the first gear 41 may be independently and detachably mounted to any one of the second support part 49, the document cover 5 and the document platen 3.

In the above-described exemplary embodiment, the third gear 43 is provided at the front of the rotating center line L1 of the second gear 42. However, the invention is not limited thereto. For example, the third gear 43 may be arranged at the rear of the rotating center line L1.

In the above-described exemplary embodiment, the swinging center line L2 of the hinge mechanisms 5A, 5B is restrained from being displaced relative to the document platen 3. However, the invention is not limited thereto. For example, it can be separation/connection displaced relative to the document platen 3 through an elastic member such as a spring and the like.

In the above-described exemplary embodiment, the first gear 41 and the second gear 42 are provided at the end portion-side of the document platen 3, rather than the hinge mechanism 5A, in the direction parallel with the swinging center line L2. However, the invention is not limited thereto. For example, the first gear 41 and the second gear 42 may be arranged between the hinge mechanism 5A and the hinge mechanism 5B.

In the above-described exemplary embodiment, the first gear 41 is arranged at the part corresponding to the range A, in which the gears 11G to 11J are provided, in the direction parallel with the rotating center line L1 of the second gear 42. However, the invention is not limited thereto. For example, the first gear may be also arranged at a position deviating from the range A.

In the above-described exemplary embodiment, the image forming unit 50 of the electrophotographic type is adopted. However, the invention is not limited thereto. For example, the image forming unit 50 of an inkjet type may be also adopted.

In the above-described exemplary embodiment, the invention is applied to the image forming apparatus 100 having the image reading apparatus 1 and the image forming unit 50. However, the invention is not limited thereto. For example, the invention may be also applied to a monolithic image reading apparatus.

Further, the invention is not limited to the above-described exemplary embodiment, and other modifications may be made within a scope of the invention as defined in the following claims.

What is claimed is:

1. An image reading apparatus having a conveyed document reading function of reading a conveyed document and a placed document reading function of reading a document placed on a placing surface of a document platen, the image reading apparatus comprising:
    an imaging unit movable below the placing surface;
    a moving mechanism configured to move the imaging unit;
    a document cover displaceable between a position closing the placing surface and a position spaced from the placing surface;
    a hinge mechanism configured to connect the document cover to the document platen such that the document cover is swingable;
    a conveyance mechanism provided to the document cover and configured to convey a document placed on the document cover upon operation of the conveyed document reading function;
    a driving force transmission mechanism configured to selectively transmit a driving force generated from a driving source to the moving mechanism or the conveyance mechanism;
    a first gear which, when the driving force is transmitted to the moving mechanism or the conveyance mechanism, is configured to rotate by receiving the driving force from the driving force transmission mechanism; and
    a second gear configured to rotate while being meshed with the first gear and to transmit the driving force to the moving mechanism or the conveyance mechanism, the second gear having a rotating center line, the rotating center line and a swinging center line of the hinge mechanism being a same line.

2. The image reading apparatus according to claim 1, wherein the driving source and the driving force transmission mechanism are provided to the document platen.

3. The image reading apparatus according to claim 1, wherein the first gear and the second gear are conical bevel gears.

4. The image reading apparatus according to claim 3, wherein the swinging center line of the hinge mechanism and the rotating center line of the second gear are parallel with the placing surface,
    wherein a rotating center line of the first gear is parallel with a direction orthogonal to the placing surface, and
    wherein the image reading apparatus further comprises a third gear that is a bevel gear configured to transmit the driving force transmitted to the second gear towards the conveyance mechanism, the third gear having a rotating center line orthogonal to the rotating center line of the second gear.

5. The image reading apparatus according to claim 3, wherein the swinging center line of the hinge mechanism and the rotating center line of the second gear are located at a position deviating towards the document cover side from the placing surface.

6. The image reading apparatus according to claim 3, further comprising:
    a joint part configured to transmit the driving force from an output part of the driving force transmission mechanism to the first gear,
    wherein the joint part is configured to absorb a deviation of a rotating center line of the output part relative to a rotating center line of the first gear.

7. The image reading apparatus according to claim 3, further comprising:
    a first support part configured to rotatably support the first gear; and
    a second support part configured to rotatably support the second gear,
    wherein one of the first support part and the second support part is mounted to the document cover and the other is mounted to the one of the first support part and the second support part mounted to the document cover.

8. The image reading apparatus according to claim 7, wherein the second support part comprises a shaft that coincides with the rotating center line of the second gear and is mounted to the document cover, and
    wherein the first support part is suspended from the shaft configuring the second support part.

9. The image reading apparatus according to claim 8, wherein the first support part is detachably mounted to the second support part while supporting the first gear.

10. The image reading apparatus according to claim 4, wherein the third gear is configured to be provided at the placing surface-side rather than the rotating center line of the second gear in a direction parallel with the placing surface and orthogonal to the rotating center line of the second gear.

11. The image reading apparatus according to claim 1, further comprising:
    a restraint part configured to restrain the swinging center line of the hinge mechanism from being displaced relative to the document platen.

12. The image reading apparatus according to claim 6, wherein the joint part is a universal joint.

13. The image reading apparatus according to claim 1, wherein the first gear and the second gear are provided at an end portion-side of the document platen rather than the hinge mechanism in a direction parallel with the swinging center line.

14. The image reading apparatus according to claim 1, wherein the conveyance mechanism comprises a plurality of gears arranged in a direction parallel with the rotating center line of the second gear, and
    wherein the first gear is arranged at a position within a range in which the plurality of gears is provided in a direction parallel with the rotating center line of the second gear.

15. The image reading apparatus according to claim 1, further comprising:
    a first output gear configured to transmit the driving force from the driving force transmission mechanism towards the moving mechanism; and
    a second output gear configured to transmit the driving force from the driving force transmission mechanism towards the conveying mechanism.

16. The image reading apparatus according to claim 15, wherein the driving force transmission mechanism comprises:
    a sun gear coupled to the driving force and configured to be rotated by receiving the driving force from the driving source; and
    a planetary gear coupled to the sun gear and configured to be rotated around a rotation center thereof and to revolve around the sun gear by receiving the driving force from the sun gear, and
    wherein the planetary gear is configured to revolve around the sun gear so as to move to a position meshing with the first output gear for transmitting the driving force towards the first output gear and a position meshing with the second output gear for transmitting the driving force towards the second output gear.

17. An image forming apparatus comprising:
the image reading apparatus according to claim 1; and
an image forming unit configured to form an image on a sheet.

* * * * *